(12) United States Patent
Gassner et al.

(10) Patent No.: US 12,511,018 B2
(45) Date of Patent: Dec. 30, 2025

(54) SYSTEM AND METHOD FOR GENERATING DYNAMIC LAYOUTS IN A COMPLEX COMPUTING NETWORK

(71) Applicant: Veeva Systems Inc., Pleasanton, CA (US)

(72) Inventors: Peter Gassner, Pleasanton, CA (US); Andrew Han, Needham, MA (US); Bobby Ng, San Ramon, CA (US); Joonha Shin, Mississauga (CA); David John Mills, Pleasanton, CA (US); Christopher Michael Rink, Danville, CA (US); Ricardo Lucio da Silva, Valinhos (BR); Rachel Evelyn Leeman-Munk, San Jose, CA (US); Kit Bramble, Oakland, CA (US); Kevin Wong, San Francisco, CA (US)

(73) Assignee: Veeva Systems Inc., Pleasanton, CA (US)

( * ) Notice: Subject to any disclaimer, the term of this patent is extended or adjusted under 35 U.S.C. 154(b) by 201 days.

(21) Appl. No.: 18/531,538

(22) Filed: Dec. 6, 2023

(65) Prior Publication Data

US 2025/0190091 A1 Jun. 12, 2025

(51) Int. Cl.
*G06F 3/0482* (2013.01)
*G06F 3/0486* (2013.01)

(52) U.S. Cl.
CPC .......... *G06F 3/0482* (2013.01); *G06F 3/0486* (2013.01)

(58) Field of Classification Search
CPC .............................. G06F 3/0482; G06F 3/0486
See application file for complete search history.

(56) References Cited

U.S. PATENT DOCUMENTS

| | | | |
|---|---|---|---|
| 10,379,701 B2 * | 8/2019 | Langridge | G06F 3/0482 |
| 11,514,232 B2 * | 11/2022 | Sullivan | G06F 40/106 |
| 2022/0129117 A1 * | 4/2022 | Lin | G06F 3/0486 |
| 2023/0146478 A1 * | 5/2023 | You | G09G 5/14 |
| | | | 715/764 |

\* cited by examiner

*Primary Examiner* — Seth A Silverman
(74) *Attorney, Agent, or Firm* — Finnegan, Henderson, Farabow, Garrett & Dunner, LLP

(57) ABSTRACT

Disclosed is a method, system, and computer program product for using layouts to dynamically and selectively display data in a complex computing network. In some embodiments, a method is provided for determining a first object, generating a first layout for the first object, generating a second layout for the first object, generating a first layout profile comprising the first layout for the first object, generating a second layout profile comprising the second layout for the first object, assigning the first layout profile to a first user type, and assigning the second layout profile to the second user type.

20 Claims, 20 Drawing Sheets

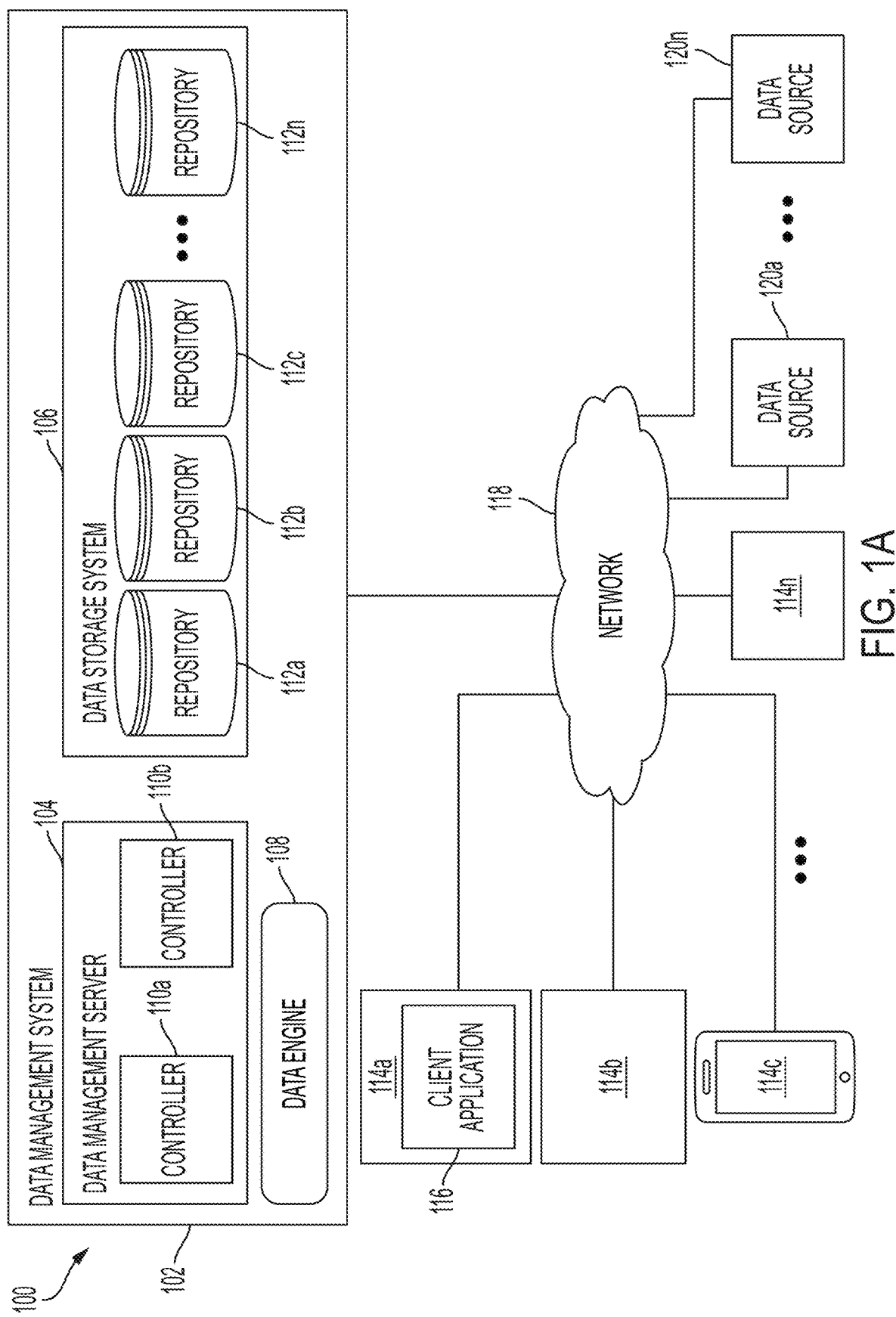

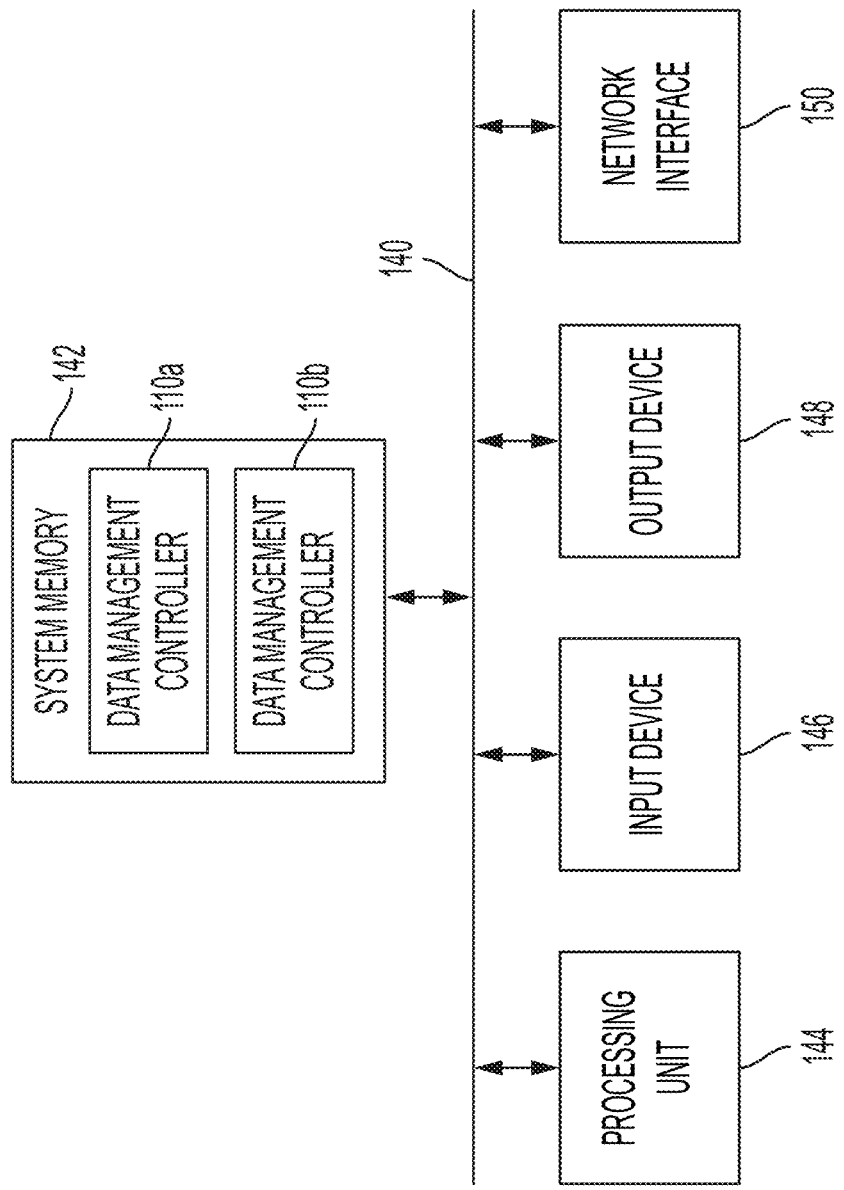

FIG. 2

Configure Page Layout for User Records

Objects > User

Admin | Logs | Users & Groups | Configuration | Operations | Deployment | Connections | Settings Sidebar (601):
- Domain User
- General Info
- Account Activation
- Details
- Groups
- User Role
- Inbox Documents: Sharing
- Security Overrides
- Delegate Access
- Support
- Email Preferences
- User Role Setup
- Workflow Timeline
- Application Licensing
- Devices
- Search Preferences Layout Rules (2) [Cancel] [Save]

Domain User (603)

General Info (602)
- Name*  | Language*
- First Name* | Locale*
- Last Name* | Timezone*
- User Name* | Location
- Email* | Office Phone
- Company | Mobile
- Title | Fax
- Alias | Preferred Currency
- Manager | Holiday Schedule
- Image | Primary Customer
- ⊕ Add ▾

Account Activation
- Activation Date | Lifecycle State
- Inactivation Date | Status
- Last Login | Send Welcome Email on Activation Date
- ⊕ Add ▾

SYSTEM AND METHOD FOR GENERATING DYNAMIC LAYOUTS IN A COMPLEX COMPUTING NETWORK

TECHNICAL FIELD

The present disclosure relates to configuring layouts for a user interface.

BACKGROUND

Due to the rapid rate at which data is being collected, analyzed, and used to solve problems in multiple industries, there is a need for systems, architectures, and applications that provide seamless mechanisms for displaying data in a record from a plurality of sources. Data that is meaningfully displayed in a data structure facilitates efficient execution of diligence operations on the data to transform the data into useful information for use by the user. More importantly, there is a need for systems, architectures, and applications that can provide a tailored experience to users to facilitate efficient processing of data directed to health applications, agriculture applications, education applications, government applications, defense applications, etc.

SUMMARY

The present disclosure is directed to a method, system, and computer program for using layout profiles to selectively display data to users in a complex computing network. According to one embodiment, the method comprises determining a first object and generating a first layout for the first object by using one or more computing device processors. The first layout may comprise one or more first display sections and one or more second display sections. The method, for example, may include generating, using one or more computing device processors, a second layout for the first object. The second layout may comprise the one or more first display sections and may not comprise the one or more second display sections. The method may also include using the one or more computing device processors to generate: 1) a first layout profile comprising the first layout for the first object and 2) a second layout profile comprising the second layout for the first object. In one embodiment, display sections may allow users to interface with a computer, view stored, generated or transmitted data in the form of text or graphics, modify stored, generated or transmitted data, etc. The method may further include using the one or more computing device processors to assign to the first layout profile to a first user type and the first layout profile is not assigned to a second user type. In some embodiments, the term user type (first user type or second user type) in the disclosure at least refers to an administrative user, transmitting user or non-administrative user, recipient user, client user, computer, server, etc. The method may also include using the one or more computing device processors to assign the second layout profile to the second user type where the second layout profile is not assigned to the first user type. In some embodiments, the one or more computing device processors may be used to determine a first user and the first user accesses the first object. In response to determining the first user accesses the first object is of the first user type. The method using the one or more computing device processors also include following: the first user type may associate with the first layout profile, and initiate display of, the first layout, associated with the first layout profile, for the first object, such that the one or more first display sections and the one or more second display sections are displayed to the first user; determining, a second user, of the second user type, accesses the first object and in response to determining the second user accesses the first object is of the second user type, determining, the second user type is associated with the second layout profile, and initiating display of, using the one or more computing device processors, the second layout, associated with the second layout profile, for the first object, such that the one or more first display sections, and not the one or more second display sections, are displayed to the second user.

According to one embodiment, the method may include following: the one or more first display sections comprising a first input section, wherein the first input section comprises guiding text that disappears in response to the first user entering input into the first input section; the first user type is associated with a first permission, wherein the first permission is associated with viewing or modifying a first element or field of a display section, and the second user type is associated with a second permission, wherein the second permission is associated with the viewing or modifying the first element or field, or a second element or field, of the display section; providing a metadata loader for loading or modifying metadata into or comprised in the first layout profile or the second layout profile; and providing a layout editor for editing the first layout profile or the second layout profile; the layout editor to rearrange the one or more second display sections within the one or more first display sections; the layout editor to insert one or more display elements or fields into the first layout or the second layout; saving, using a single selection of a save option, of multiple edits to at least one of the one or more first display sections or the one or more second display section by using layout editor; the first layout profile further comprising a third layout for either the first object, a second object, or a third object; the one or more second display sections are hidden from the second user; he one or more first display sections are arranged adjacent to the one or more second display sections for the first user; dynamically modifying the first layout profile or the second layout profile based on user data or a user function associated with the first user type or the second user type, respectively; disabling inactive display sections from being added to the first layout profile or the second layout profile; providing one or more display rules associated with at least one of the first layout profile, the second layout profile, the first user type, or the second user type; enabling a user to generate or modify a third layout using the first layout or the second layout; dynamically modifying the first layout or the second layout based on user data or a user function associated with the first user type or the second user type, respectively; and dynamically modifying the first layout or the second layout based on user data or a user function associated with the first user or the second user, respectively, at or about a time of the first user or the second user accessing the first object.

According to another aspect of the subject matter described in this disclosure, a An apparatus for using layout profiles to selectively display data to users is provided. The system includes one or more computing device processors. One or more computing device memories are coupled to the one or more computing device processors. The one or more computing device memories store instructions executed by the one or more computing device processors, the instructions are configured to: determine a first object; generate a first layout for the first object, wherein the first layout comprises one or more first display sections and one or more second display sections; generate a second layout for the first object, wherein the second layout comprises the one or more first display sections and does not comprise the one or more second display sections; generate a first layout profile comprising the first layout for the first object; generate a second layout profile comprising the second layout for the first object; assign the first layout profile to a first user type, wherein the first layout profile is not assigned to a second user type; assign the first layout profile to the second user type, wherein the second layout profile is not assigned to the first user type; determine a first user, of the first user type, accesses the first object; in response to determining the first user accesses the first object is of the first user type, determine the first user type is associated with the first layout profile, and initiate display of the first layout, associated with the first layout profile, for the first object, such that the one or more first display sections and the one or more second display sections are displayed to the first user; determine a second user, of the second user type, accesses the first object; and in response to determining the second user accesses the first object is of the second user type, determine the second user type is associated with the second layout profile, and initiate display of the second layout, associated with the second layout profile, for the first object, such that the one or more first display sections, and not the one or more second display sections, are displayed to the second user. According to embodiment, the one or more computing processors are comprised in one or more computing devices or servers, wherein the one or more computing devices or servers are located in one or more locations.

According to another aspect of the subject matter described in this disclosure, a non-transitory computer-readable medium is provided which comprises code configured or operable to following: determine a first object; generate a first layout for the first object, wherein the first layout comprises one or more first display sections and one or more second display sections; generate a second layout for the first object, wherein the second layout comprises the one or more first display sections and does not comprise the one or more second display sections; generate a first layout profile comprising the first layout for the first object; generate a second layout profile comprising the second layout for the first object; assign the first layout profile to a first user type, wherein the first layout profile is not assigned to a second user type; assign the first layout profile to the second user type, wherein the second layout profile is not assigned to the first user type; determine a first user, of the first user type, accesses the first object; in response to determining the first user accesses the first object is of the first user type, determine the first user type is associated with the first layout profile, and initiate display of the first layout, associated with the first layout profile, for the first object, such that the one or more first display sections and the one or more second display sections are displayed to the first user; determine a second user, of the second user type, accesses the first object; and in response to determining the second user accesses the first object is of the second user type, determine the second user type is associated with the second layout profile, and initiate display of the second layout, associated with the second layout profile, for the first object, such that the one or more first display sections, and not the one or more second display sections, are displayed to the second user.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components be omitted in certain figures for clarity of discussion. Reference is now made to the following descriptions taken in conjunction with the accompanying drawings, in which:

FIG. 1A illustrates an example high level block diagram of a data management architecture wherein the present technology may be implemented according to some embodiments of the present disclosure.

FIG. 1C illustrates an example high level block diagram of the data management server according to some embodiments of the present disclosure.

FIG. 2 illustrates an example object record detail user interface, according to some embodiments.

FIG. 6 illustrates an exemplary layout editor user interface for editing layouts, according to some embodiments.

FIG. 7 illustrates an example user interface to insert page or section using layout editor, according to some embodiments.

FIG. 8 illustrates an example user interface to input section type using layout editor, according to some embodiments.

FIG. 9 illustrates an example user interface to add section details using layout editor, according to some embodiments.

FIG. 10 illustrates an example user interface where a section is added between two sections using layout editor, according to some embodiments.

FIG. 15 illustrates an example user interface to illustrates a configuration user interface to create layout rules, according to some embodiments.

FIGS. 16A-16B are schematic diagrams illustrating column re-balancing to fields after applying hide layout rule, according to some embodiments.

FIG. 17 illustrates an example user interface layout of a lifecycle state, according to some embodiments.

Figure 1B:
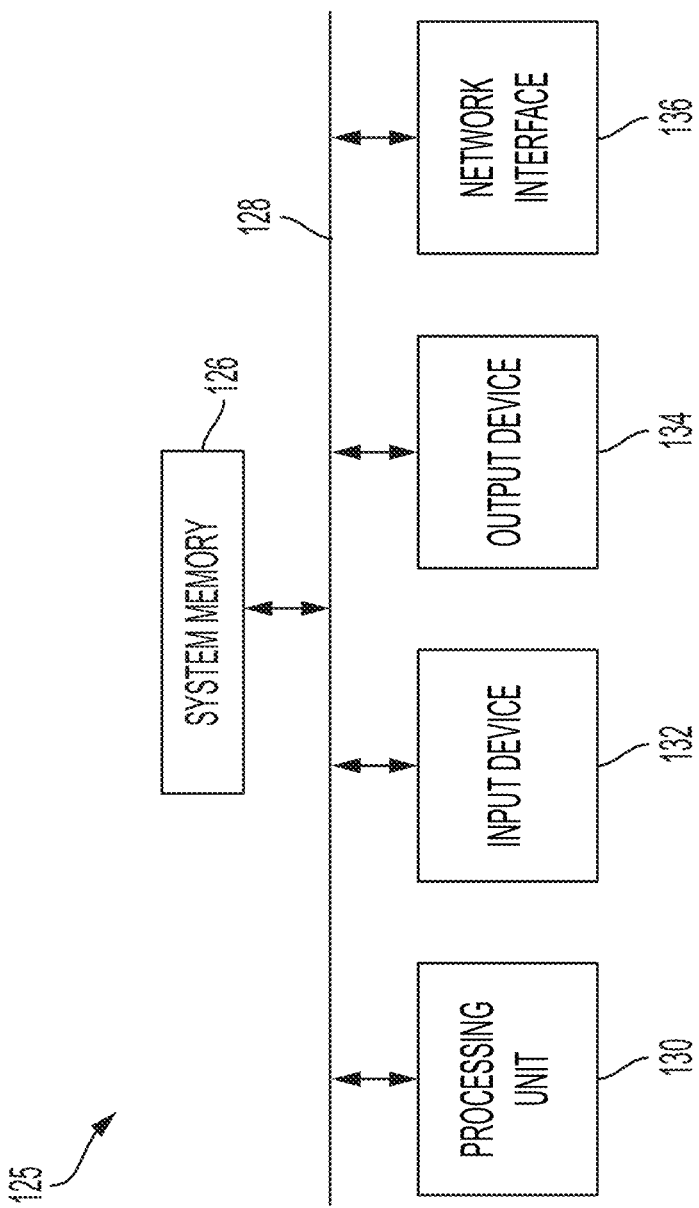
FIG. 1B illustrates an example block diagram of a computing device according to some embodiments of the present disclosure.

Although similar reference numbers may be used to refer to similar elements for convenience, it can be appreciated that each of the various example embodiments may be considered to be distinct variations. As used in this disclosure, the terms "embodiment" and "example embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/of" may refer to and encompass any and all possible combinations of one or more of the associated listed items.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

In some embodiments, "dynamic" may refer to action or change in real time, thereby allowing the system to customize the user's experience, and provides interactive contextual guidance to the user.

System Environment

FIG. 1A illustrates an example high level block diagram of a data management architecture 100 wherein the present disclosure may be implemented. As shown, the architecture 100 may include a data management system 102 and a plurality of user computing devices 114a, 114b, . . . 114n, coupled to each other via a network 118. The data management system 102 may include a data storage system 106 and a data management server 104. The data storage system 106 may have two or more repositories, e.g., 112a, 112b, 112c, . . . and 112n. The network 118 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 114a-114n may be any machine or system that is used by a user to access the data management system 102 via the network 118, and may be any commercially available computing devices including laptop computers, desktop computers, mobile phones, smart phones, tablet computers, netbooks, and personal digital assistants (PDAs). A client application 116 may run from a user computing device, e.g., 114a, and access data in the data management system 102 via the network 118.

The data storage system 106 may store data that client applications (e.g., 116) in user computing devices 114a-114n may access and may be any commercially available storage devices. Each content repository (e.g., 112a, 112b or 112n) may store a specific category of data and allow users to interact with its data in a specific business context. It should be appreciated that content repositories may be separate logic sections in a same storage device.

The data management server 104 is typically a remote computer system accessible over a remote or local network, such as the network 118. The data management server 104 may store a data management controller 110a and a data collection controller 110b for controlling management and collection of the data. The data management server 104 could be any commercially available computing devices. Although only one server is shown, it should be appreciated that the data management system 102 may have a plurality of servers and the controllers 110a and 110b may be in separate servers. A client application (e.g., 116) process may be active on one or more user computing devices 114a-114n. The corresponding server process may be active on the data management server 104. The client application process and the corresponding server process may communicate with each other over the network 118, thus providing distributed functionality and allowing multiple client applications to take advantage of the information-gathering capabilities of the data management system 102. Moreover, the data engine 108 shown within the data management system 102 may include one or more units, including a data aggregation unit 172, a data cleaning unit 174, and a data transformation unit 176. These and other aspects are further discussed below in association with FIG. 1D. In one embodiment, the data management system 102 may run on a cloud computing platform. In one embodiment, the data management system 102 may be provided as Software as a Service ("SaaS") to allow users to access the data management system 102 with a client.

Data sources 120a . . . 120n may be configured to transmit and/or receive data to and from the data management system 102. In particular, the data from the data sources 120a . . . 120n may include data from a plurality of different sources that generate data in similar and/or in dissimilar formats. It is appreciated that the data from one or more of the data sources 120a . . . 120n may include data from one or more servers associated with medical institutions, government institutions, educational institutions, agricultural agencies, defense contractor institutions, etc., according to some embodiments. It is appreciated that the data from the one or more of the data sources 120a . . . 120n may be representative data such as a symbol, placeholder, or other identifying character that represents data in similar and/or in dissimilar formats such that the content repository 113 may interpret the representative data to determine the data it represents.

FIG. 1B illustrates an example block diagram of a computing device 122 which can be used as the user computing devices 114a-114n, and the data management server 104 in FIG. 1A. The computing device 122 is only one example of a suitable computing environment and is not intended to suggest any limitation as to scope of use or functionality. The computing device 122 may include a processing unit 128, a system memory 124, an input device 130, an output device 132, a network interface 134 and a system bus 126 that couples these components to each other.

The processing unit 128 may be configured to execute computer instructions that are stored in a computer-readable medium, for example, the system memory 124. The processing unit 128 may be a central processing unit (CPU).

The system memory 124 typically includes a variety of computer readable media which may be any available media accessible by the processing unit 128. For instance, the system memory 124 may include computer storage media in the form of volatile and/or nonvolatile memory such as read only memory (ROM) and/or random-access memory (RAM). By way of example, but not limitation, the system memory 124 may store instructions and data, e.g., an operating system, program modules, various application programs, and program data.

A user can enter commands and information to the computing device 122 through the input device 130. The input device 130 may be, e.g., a keyboard, a touchscreen input device, a touch pad, a mouse, a microphone, and/or a pen.

The computing device 122 may provide its output via the output device 132 which may be, e.g., a monitor or other type of display device, a speaker, or a printer.

The computing device 122, through the network interface 134, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 118) and/or buses. The network interface 134 may be configured to allow the computing device 122 to transmit and receive data in a network, for example, the network 118. The network interface 134 may include one or more network interface cards (NICs).

FIG. 1C illustrates an example high level block diagram of the data management server 104 according to one embodiment of the present disclosure. The data management server 104 may be implemented by the computing device 122, and may have a processing unit 140, a system memory 138, an input device 142, an output device 144, and a network interface 146, coupled to each other via a system bus 136. The system memory 138 may store a data management controller 110a and/or a data collection controller 110b.

Figure 1D:
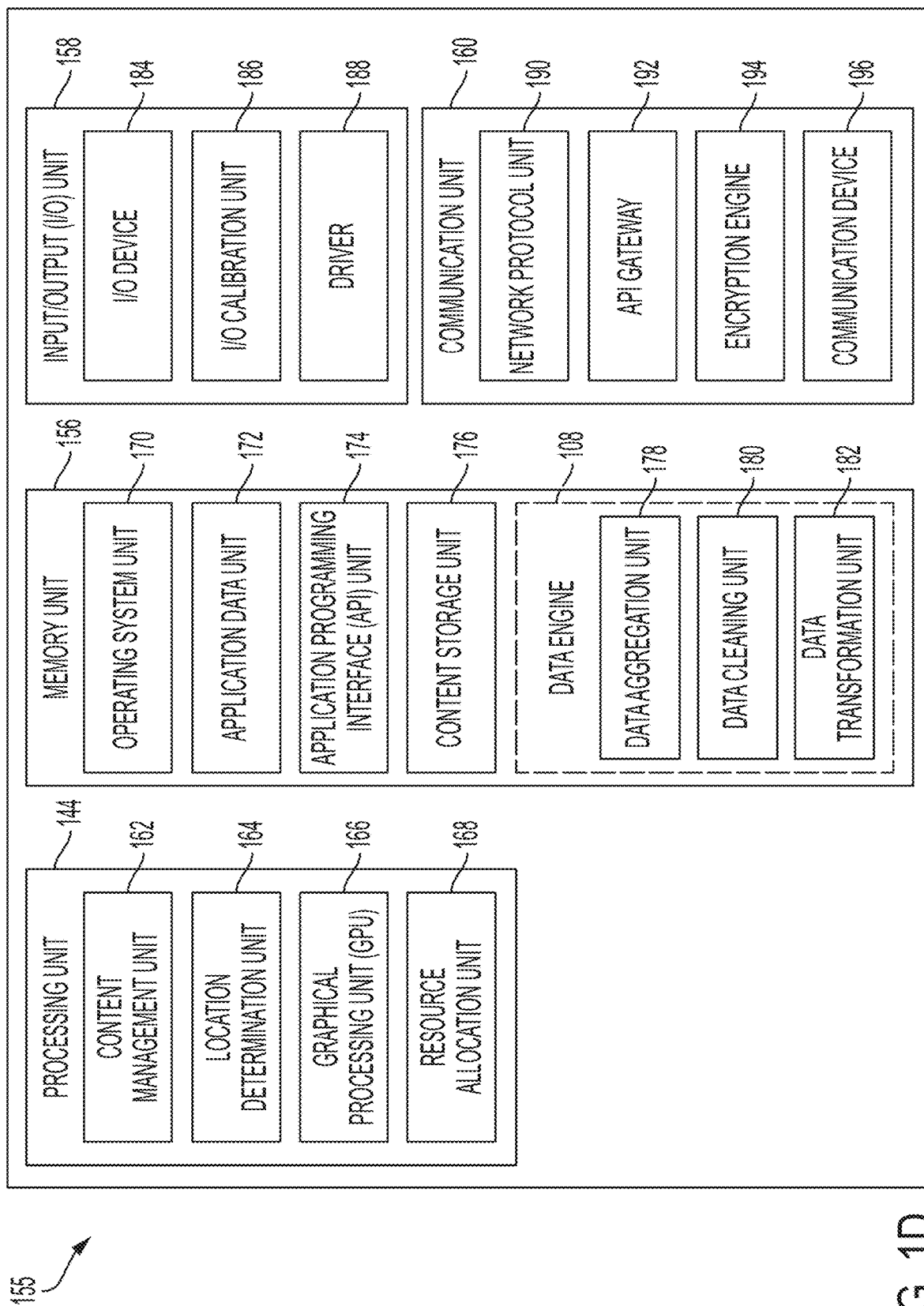
FIG. 1D is a functional block diagram of a computing environment, in accordance with some embodiments of this disclosure.

FIG. 1D illustrates an exemplary functional diagram of a computing environment 148, according to some embodiments of this disclosure, for performing the operations described herein. It is appreciated that the computing environment 148 may be implemented in one or more elements of the data management architecture 100, such as the data storage system 106, the data management server 104, the data sources 120a . . . 120n, the network 118, or the repositories 112a . . . 112n. As seen in FIG. 1D, the computing environment 148 may include a processing unit 140, a memory unit 150, an I/O unit 152, and a communication unit 154. The processing unit 140, the memory unit 150, the I/O unit 152, and the communication unit 154 may include one or more subunits for performing operations described herein. Additionally, each unit and/or subunit may be operatively and/or otherwise communicatively coupled with each other so as to facilitate the operations described herein. The computing environment 148 including any of its units and/or subunits may include general hardware, specifically purposed hardware, and/or software.

The processing unit 140 of the computing environment 148 may control one or more of the memory units 150, the I/O unit 152, and the communication unit 154, as well as any included subunits, elements, components, devices, and/or functions performed by the memory unit 150, I/O unit 152, and the communication unit 154. The described sub-elements of the computing environment 148 may also be included in similar fashion in any of the other units and/or devices included in the data management architecture 100 of FIG. 1A. Additionally, any actions described herein as being performed by a processor may be taken by the processing unit 140 of FIG. 1D alone and/or by the processing unit 140 in conjunction with one or more additional processors, units, subunits, elements, components, devices, and/or the like. Further, while one processing unit 140 may be shown in FIG. 1D, multiple processing units may be present and/or otherwise included in the computing environment 148 or elsewhere in the overall data management architecture 100 of FIG. 1A. Thus, while instructions may be described as being executed by the processing unit 140 and/or various subunits of the processing unit 140, the instructions may be executed simultaneously, serially, and/or otherwise by one or multiple processing units 140 on one or more devices.

In some embodiments, the processing unit 140 may be implemented as one or more computer processing unit (CPU) chips and/or graphical processing unit (GPU) chips and may include a hardware device capable of executing computer instructions. The processing unit 140 may execute instructions, codes, computer programs, and/or scripts. The instructions, codes, computer programs, and/or scripts may be received from and/or stored in the memory unit 150, the I/O unit 152, the communication unit 154, subunits, and/or elements of the aforementioned units, other devices, and/or computing environments, and/or the like.

In some embodiments, the processing unit 140 may include, among other elements, subunits such as a content management unit 156, a location determination unit 158, a graphical processing unit (GPU) 160, and a resource allocation unit 162. Each of the aforementioned subunits of the processing unit 140 may be communicatively and/or otherwise operably coupled with each other.

The content management unit 156 may facilitate generation, modification, analysis, transmission, and/or presentation of content. Content may be file content, media content, or any combination thereof. In some instances, content on which the content management unit 156 may operate includes device information, user interface data, images, text, themes, audio files, video files, documents, data from the one or more data sources 120a . . . 120n, etc. Additionally, the content management unit 156 may control the audio-visual environment and/or appearance of application data during execution of various processes. In some embodiments, the content management unit 156 may interface with other third-party content server and/or memory location for execution of its operations.

The location determination unit 158 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 158 may include various sensors, radar, and/or other specifically purposed hardware elements for the location determination unit 158 to acquire, measure, and/or otherwise transform location information.

The GPU 160 may facilitate generation, modification, analysis, processing, transmission, and/or presentation of content described above, as well as any data described herein. In some embodiments, the GPU 160 may be used to render content for presentation on a computing device via, for example, a web GUI or user portal associated with the data management system 102. The GPU 160 may also include multiple GPUs and therefore may be configured to perform and/or execute multiple processes in parallel. In some implementations, the GPU 160 may be used in conjunction with the data engine 108, and/or in conjunction with other subunits associated with the memory unit 150, the I/O unit 152, and the communication unit 154.

The resource allocation unit 162 may facilitate the determination, monitoring, analysis, and/or allocation of computing resources throughout the computing environment 148 and/or other computing environments. For example, the computing environment may facilitate a high volume of data (e.g., files and data from the one or more data sources 120a . . . 120n and or data from the data management system 102), to be processed and analyzed. As such, computing resources of the computing environment 148 used by the processing unit 140, the memory unit 150, the I/O unit 152, and/or the communication unit 154 (and/or any subunit of the aforementioned units) such as processing power, data storage space, network bandwidth, and/or the like may be in high demand at various times during operation. Accordingly, the resource allocation unit 162 may include sensors and/or other specially purposed hardware for monitoring performance of each unit and/or subunit of the computing environment 148, as well as hardware for responding to the computing resource needs of each unit and/or subunit. In some embodiments, the resource allocation unit 162 may use computing resources of a second computing environment separate and distinct from the computing environment 148 to facilitate a desired operation.

For example, the resource allocation unit 162 may determine a number of simultaneous computing processes and/or requests. The resource allocation unit 162 may also determine that the number of simultaneous computing processes and/or requests meets and/or exceeds a predetermined threshold value. Based on this determination, the resource allocation unit 162 may determine an amount of additional computing resources (e.g., processing power, storage space of a particular non-transitory computer-readable memory medium, network bandwidth, and/or the like) required by the processing unit 140, the memory unit 150, the I/O unit 152, the communication unit 154, and/or any subunit of the aforementioned units for safe and efficient operation of the computing environment while supporting the number of simultaneous computing processes and/or requests. The resource allocation unit 162 may then retrieve, transmit, control, allocate, and/or otherwise distribute determined amount(s) of computing resources to each element (e.g., unit and/or subunit) of the computing environment 148 and/or another computing environment.

In some embodiments, factors affecting the allocation of computing resources by the resource allocation unit 162 may include the number of computing processes and/or requests, a duration of time during which computing resources are required by one or more elements of the computing environment 148, and/or the like. In some implementations, computing resources may be allocated to and/or distributed amongst a plurality of second computing environments included in the computing environment 148 based on one or more factors mentioned above. In some embodiments, the allocation of computing resources of the resource allocation unit 162 may include the resource allocation unit 162 flipping a logic switch, adjusting processing power, adjusting memory size, partitioning a memory element, transmitting data, controlling one or more input and/or output devices, modifying various communication protocols, and/or the like. In some embodiments, the resource allocation unit 162 may facilitate utilization of parallel processing techniques such as dedicating a plurality of GPUs included in the processing unit 140 for running a multitude of processes.

The memory unit 150 may be used for storing, recalling, receiving, transmitting, and/or accessing various files and/or data (e.g., the aforementioned data from the data sources 120a . . . 120n) during operation of computing environment 148. For example, memory unit 150 may be utilized for storing, recalling, and/or updating data associated with, resulting from, and/or generated by any unit, or a combination of units and/or subunits of the computing environment 148. In some embodiments, the memory unit 150 may store instructions, code, and/or data that may be executed by the processing unit 201. For instance, the memory unit 150 may store code that execute operations associated with one or more units and/or one or more subunits of the computing environment 148. For example, the memory unit may store code for the processing unit 140, the I/O unit 152, the communication unit 154, and for itself. In some embodiments, the memory unit may store a specialized database and/or an application programming interface (API) database comprising information (e.g., associated with object-based data or object-related data or object-oriented data and/or content-related data and/or measured data and/or the like) that may be accessed and/or used by applications, units, elements, and/or operating systems of computing devices and/or computing environment 148. In some embodiments, each API database may be associated with a customized physical circuit included in the memory unit 150 and/or the API unit 168. Additionally, each API database may be public and/or private, and so authentication credentials associated with one or more access protocols may be required to access information in the API database.

The memory unit 150 may include various types of data storage media such as solid-state storage media, hard disk storage media, virtual storage media, and/or the like. The memory unit 150 may include dedicated hardware elements such as hard drives and/or servers, as well as software elements such as cloud-based storage drives. In some implementations, the memory unit 150 may comprise one or more of a random-access memory (RAM) device, a dynamic random-access memory (DRAM) device, a static random access memory (SRAM) device, flash memory, read only memory (ROM) device, and/or various forms of secondary storage. The RAM device may be used to store volatile data and/or to store instructions that may be executed by the processing unit 140. For example, the instructions stored by the RAM device may be a command, a current operating state of computing environment 148, an intended operating state of computing environment 148, and/or the like. As a further example, data stored in the RAM device of the memory unit 150 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 150 may include one or more databases (e.g., a database associated with one or more repository 112a . . . 112n) for storing any data described herein. Additionally or alternatively, one or more secondary databases (e.g., the one or more repository 112a . . . 112n discussed with reference to FIG. 1A) located remotely from computing environment 148 may be used and/or accessed by the memory unit 150.

Turning back to FIG. 1D, the memory unit 150 may include subunits such as an operating system unit 164, an application data unit 166, an application programming interface 168, a content storage unit 170, data engine 108, and a cache storage unit (not shown). Each of the aforementioned subunits of the memory unit 150 may be communicatively and/or otherwise operably coupled with each other and other units and/or subunits of the computing environment 148. It is also noted that the memory unit 150 may include other modules, instructions, or code that facilitate the execution of the techniques described herein. For instance, the memory unit 150 may include one or more modules such as a receiving module, a mapping module, a determining module, a sequencing module, a quantifying module, a resolving module, a parsing module, a visualization module, etc., that comprise instructions executable by one or more computing device processors to accomplish one or more operations provided in this disclosure.

The operating system unit 164 may facilitate deployment, storage, access, execution, and/or utilization of an operating system used by computing environment 148 and/or any other computing environment described herein. In some embodiments, operating system unit 164 may include various hardware and/or software elements that serve as a structural framework for processing unit 140 to execute various operations described herein. Operating system unit 164 may further store various pieces of information and/or data associated with the operation of the operating system and/or computing environment 148 as a whole, such as a status of computing resources (e.g., processing power, memory availability, resource utilization, and/or the like), runtime information, modules to direct execution of operations described herein, user permissions, security credentials, and/or the like.

The application data unit 166 may facilitate deployment, storage, access, execution, and/or utilization of an application and/or data used by computing environment 148 and/or any other computing environment described herein. For example, the application data unit 166 may store any information and/or data associated with an application. Application data unit 166 may further store various pieces of information and/or data associated with the operation of an application and/or computing environment 148 as a whole, such as a status of computing resources (e.g., processing power, memory availability, resource utilization, and/or the like), runtime information, user interfaces, modules to direct execution of operations described herein, user permissions, security credentials, access and processing of data stored in the data management system 102, and/or the like.

The application programming interface (API) unit 168 may facilitate deployment, storage, access, execution, and/or use of information associated with APIs of computing environment 148 and/or any other computing environment described herein. For example, computing environment 148 may include one or more APIs for various devices, applications, units, subunits, elements, and/or other computing environments to communicate with each other and/or use the same data. Accordingly, API unit 168 may be associated with or otherwise include API databases (e.g., stored in the one or more repositories 112a . . . 112n) containing information that may be accessed and/or used by applications, units, subunits, elements, and/or operating systems of other devices and/or computing environments. As previously discussed, each API database may be associated with a customized physical circuit included in memory unit 150 and/or API unit 168. Additionally, each API database may be public and/or private, and so authentication credentials may be required to access information in an API database. In some embodiments, the API unit 168 may facilitate communication between the data management system 102 and one or more client applications 116.

The content storage unit 170 may facilitate deployment, storage, access, and/or use of information associated with performance of various operations discussed herein. In some embodiments, content storage unit 170 may communicate with content management unit 156 to receive and/or transmit content files (e.g., media content and other data from the data source 120a . . . 120n).

Data engine 108 may include at least a data aggregation unit 172, a data cleaning unit 174, and a data transformation unit 176. According to some embodiments, the data engine 108 may include instructions that facilitate receiving data from a plurality of sources, aggregating the data in a specialized data structure that facilitates efficient real-time execution of diligence and/or reconciliation operations to transform the received and aggregated data and thereby generate a report indicative of whether there are one or more inconsistencies and/or validation issues associated with the aggregated data. In some implementations, the diligence and/or reconciliation operations may include automatic real-time operations that execute one or more checks or queries on the aggregated data to determine whether the aggregated data is accurate. It is appreciated that the data engine may comprise multiple engines such that there is at least one engine for data ingestion and data export. In particular, the data engine may comprise one or more engines such that each engine comprised in the one or more engines may include multiple units such as the data aggregation unit 172, the data cleaning unit 174, etc.

The cache storage unit (not shown) of the memory unit 150 may facilitate short-term deployment, storage, access, analysis, and/or utilization of data (e.g., data from the one or more data sources 120a . . . 120n). In some embodiments, the cache storage unit may serve as a short-term storage location for data so that the data stored in cache storage unit may be accessed quickly. In some instances, the cache storage unit may include RAM devices and/or other storage media types for quick recall of stored data. The cache storage unit may include a partitioned portion of storage media included in memory unit 150.

The I/O unit 152 may include hardware and/or software elements for the computing environment 148 to receive, transmit, and/or present information useful for performing diligence and/or reconciliation operations and/or other processes described herein. As described herein, I/O unit 152 may include subunits such as an I/O device 178, an I/O calibration unit 180, and/or driver 182.

The I/O device 178 may facilitate receipt, transmission, processing, presentation, display, input, and/or output of information as a result of executed processes described herein. In some embodiments, the I/O device 178 may include a plurality of I/O devices. In some embodiments, I/O device 178 may include a variety of elements that enable a user to interface with computing environment 148. For example, I/O device 178 may include a keyboard, a touchscreen, a button, a sensor, a biometric scanner, a laser, a microphone, a camera, and/or another element for receiving and/or collecting input from a user. Additionally and/or alternatively, I/O device 178 may include a display, a screen, a sensor, a vibration mechanism, a light emitting diode (LED), a speaker, a radio frequency identification (RFID) scanner, and/or another element for presenting and/or otherwise outputting data to a user.

The I/O calibration unit 180 may facilitate the calibration of the I/O device 178. For example, I/O calibration unit 180 may detect and/or determine one or more settings of I/O device 178, and then adjust or otherwise modify settings so that the I/O device 178 may operate more efficiently.

In some embodiments, I/O calibration unit 180 may use a driver 182 (or multiple drivers) to calibrate I/O device 178. For example, driver 182 may include software that is to be installed by I/O calibration unit 180 so that an element of computing environment 148 (or an element of another computing environment) may recognize and/or integrate with I/O device 178 for the operations described herein.

The communication unit 154 may facilitate establishment, maintenance, monitoring, and/or termination of communications between computing environment 148 and other computing environments, third party server systems, and/or the like (e.g., between the data management system 102, the client applications 116, and/or the data sources 120a . . . 120n). The communication unit 154 may also facilitate internal communications between various elements (e.g., units and/or subunits) of the computing environment 148. In some embodiments, the communication unit 154 may include a network protocol unit 184, an API gateway 186, an encryption engine 188, and/or a communication device 190. The communication unit 154 may include hardware and/or software elements.

The network protocol unit 184 may facilitate establishment, maintenance, and/or termination of a communication connection for the computing environment 148 by way of a network (e.g., network 118). For example, the network protocol unit 184 may detect and/or define a communication protocol required by a particular network and/or network type. Communication protocols used by the network protocol unit 184 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for the computing environment 148 may include transforming and/or translating data from being compatible with a first communication protocol to being compatible with a second communication protocol. In some embodiments, the network protocol unit 184 may determine and/or monitor an amount of data traffic to consequently determine which particular network protocol may be used for establishing a secure communication connection, transmitting data, and/or performing operations and/or processes described herein.

The application programming interface (API) gateway 186 may allow other devices and/or computing environments to access the API unit 168 of the memory unit 150 of the computing environment 148. For example, a client application 116 may access the API unit 168 of the computing environment 148 via the API gateway 186. In some embodiments, the API gateway 186 may be required to validate user credentials associated with a user (e.g., stakeholder) of the client application 116 prior to providing access to the API unit 168 to a user. The API gateway 186 may include instructions for the computing environment 148 to communicate with another device and/or between elements of the computing environment 148.

The encryption engine 188 may facilitate translation, encryption, encoding, decryption, and/or decoding of information received, transmitted, and/or stored by the computing environment 148. Using the encryption engine 188, each transmission of data may be encrypted, encoded, and/or translated for security reasons, and any received data may be encrypted, encoded, and/or translated prior to its processing and/or storage. In some embodiments, the encryption engine 188 may generate an encryption key, an encoding key, a translation key, and/or the like, which may be transmitted along with any data content.

The communication device 190 may include a variety of hardware and/or software specifically purposed to facilitate communication for the computing environment 148. In some embodiments, the communication device 190 may include one or more radio transceivers, chips, analog front end (AFE) units, antennas, processing units, memory, other logic, and/or other components to implement communication protocols (wired or wireless) and related functionality for facilitating communication for the computing environment 148. Additionally and/or alternatively, the communication device 190 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

In some embodiments, any element of any of the systems or devices shown in FIGS. 1A through 1D may be used, singly or in combination, to implement any of the functions, operations, or interfaces described herein.

Figure 2:
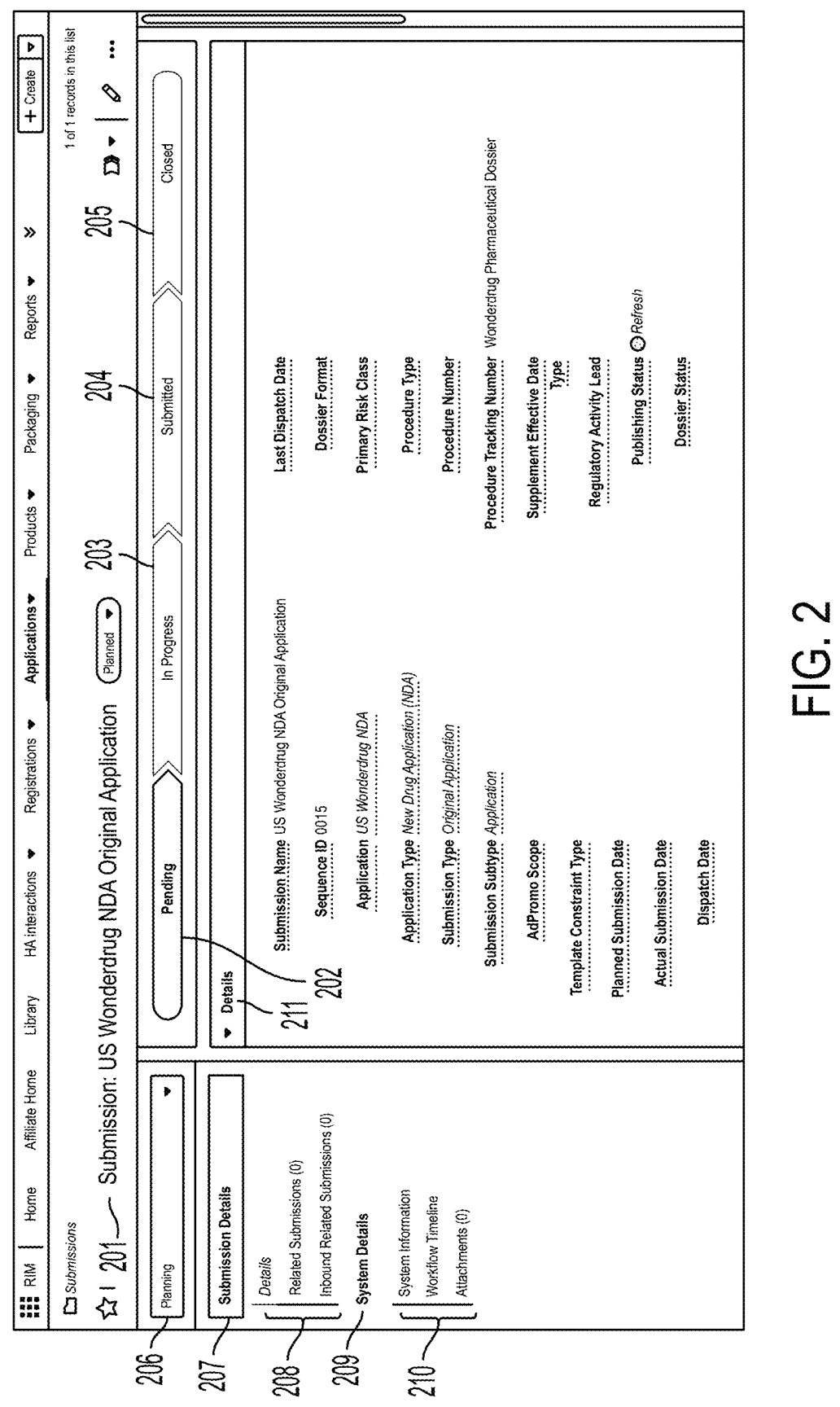

FIG. 2 illustrates an example object record detail user interface, according to some embodiments of this disclosure. The object record detail user interface for object 201 named Submission may have a left navigation area that consists of layout 206 named Planning, first page 207 named Submission Details, second page 209 named System Details and different sections (208 and 210). According to some embodiments, objects are part of a data management model, layouts are record detail display designs that are displayed to users, and pages are grouping of sections in a layout. Layouts may have different designs with one or more pages having one or more display sections. In some embodiments, the term "page" may at least one of refer to a display section (e.g., a first display section, a second display section, etc.), comprise a display section, or be comprised in a display section. It is appreciated that grouping similar sections in pages may help users to efficiently perform the tasks on the object (or object record) that user is handling. In some embodiments, the terms "object" and "object record" may be used interchangeably.

As shown in the FIG. 2, layout 206 for object 201 consist of two pages (first page 207 and second page 209) and each page has three sections. The example object record detail user interface may be used to input the necessary fields to define the object record that the user is handling. A section named details 211, when selected, may provide relevant information regarding the object that the user is handling. For example, the details 211 section may have information on submission name, sequence ID, application, application type, submission type, etc.

According to one embodiment, the example object record detail user interface may show sequences of states a document or an object record goes through during its life. Users can configure object record layouts to control what information is shown on the object record detail section based on the need of the user. A lifecycle may be simple (two states requiring users to manually move between states) or complex (multiple states with different security and workflows that automatically move the document to another state). The order of states within a lifecycle represents the stages an object record transitions during its life when users create, review, approve and finally archive or substitute it. A set of predefined rules by users applies to each state and defines what happens to the object record in that state. The data management server 104 automatically applies a set of predefined rules to every object record that enters the state. As shown in the FIG. 2, the example life cycle states are as follows: Pending 202; In Progress 203; Submitted 204; Closed 205. The Pending state 202 may generally be associated with the initial step when review of the object record is pending submission to an appropriate authority. The In Progress state 203 may involve professionals reviewing documents and information connected to the object record and determining if the appropriate information is properly added before submission is performed. The Submitted state 204 may be initiated when the object record is submitted. Finally, the Closed state 205 may be initiated to close the object record after submission. It should be noted that the layout may be different for each lifecycle state. A user may notice layout being changed automatically when lifecycle states changes.

As previously discussed, the data engine 108 facilitates executing the processing procedures, methods, techniques, and workflows provided in this disclosure. In particular, the data engine 108 may be configured to execute computing operations associated with the disclosed methods, systems/apparatuses, and computer program products.

Figure 3:
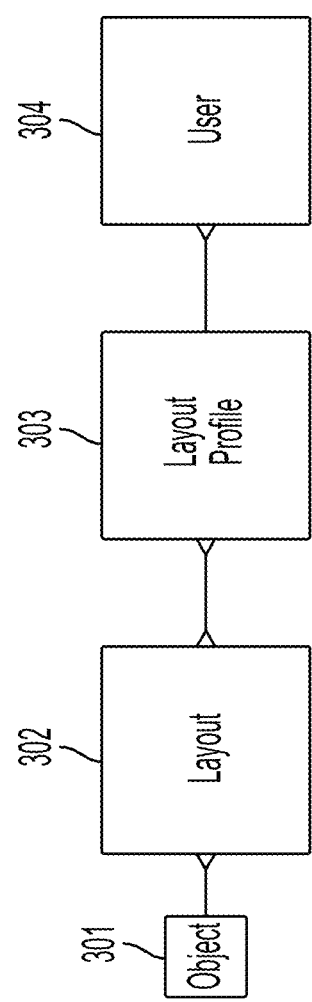
FIG. 3 illustrates an example block diagram of object record detail user interface components, according to some embodiments.

FIG. 3 illustrates an example block diagram of object record detail user interface components, according to one embodiment. The components of object record detail user interface may include object 301, layout 302, layout profile 303, user 304 etc. In some embodiments an object can have multiple layouts and this is made possible by using layout profiles. A layout profile is a selection of layouts to be assigned to users. So creating multiple layouts for an object is a three step process. The three steps are as follows: 1) Create layouts for object/object type, 2) Select layouts for layout profile, and 3) Assign a layout profile to user. For example, an object may have many layouts, and layouts may be assigned to many layout profiles or layout profiles may have many layouts, and finally a user must belong a layout profile. According to one embodiment, a user may decide not to use a layout profile. When a layout profile is not used by the user, an object may have default layouts designated by administrative users. In some embodiments, a new layout created by users may be designated as a default layout and this new layout may be created from scratch or may be copied from an existing layout. When an existing layout is used, it may be customized to accommodate a user's needs by removing, adding, updating, or hiding, pages, sections or fields. In one embodiment, a user may decide to deactivate or inactivate one of the layouts added to a layout profile of an object when that layout is not required. It should be noted that inactive layouts still exist in the system and can be made active again, if a need arises.

Figure 4:
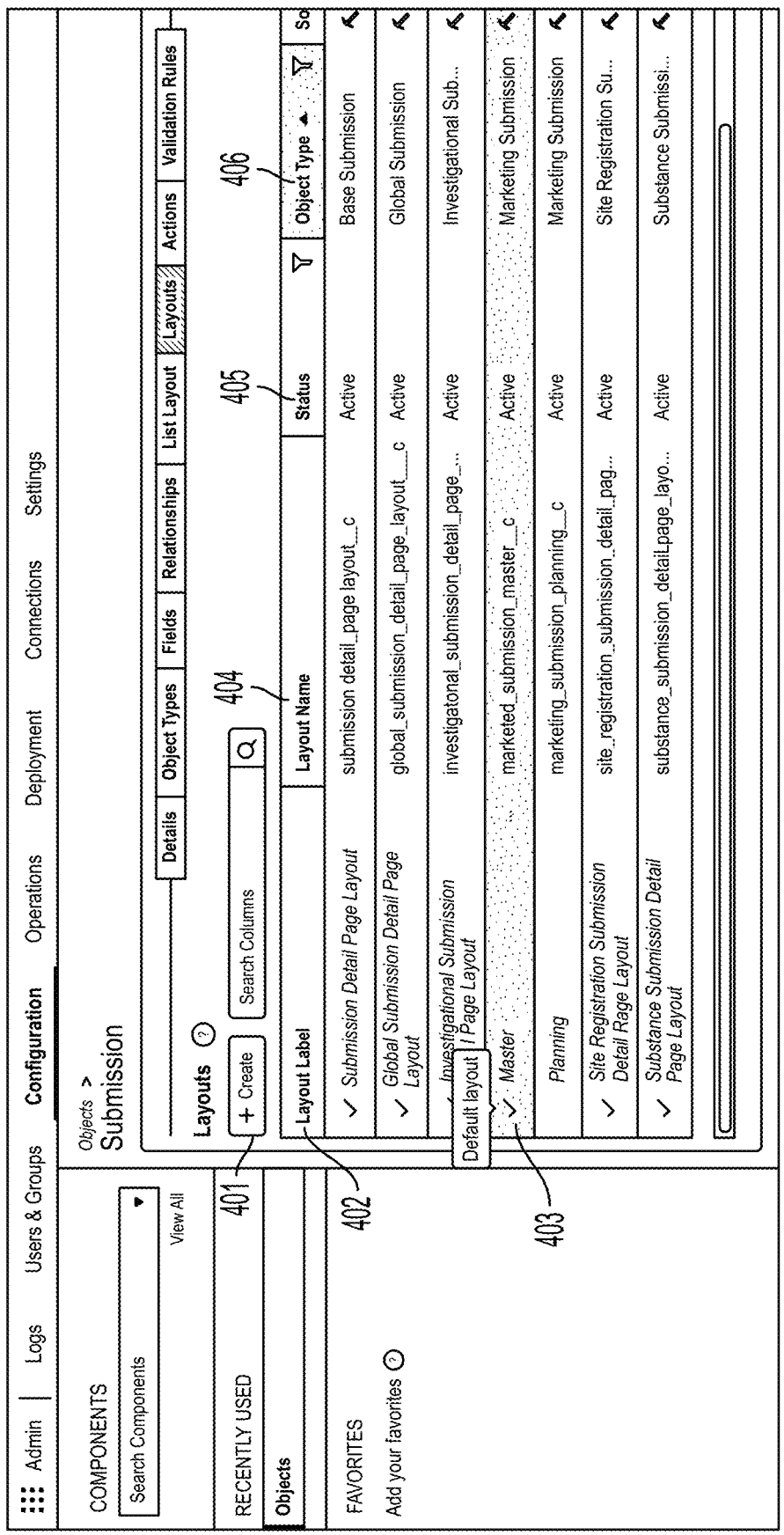
FIG. 4 illustrates an example of default layout of an object, according to some embodiments.

FIG. 4 illustrates an example of default layout of an object, according to one embodiment. It should be noted that users may decide not to use a layout profile. When a layout profile is not used, an object may have user-designated default layouts. In some embodiments, a new layout created by user may be designated as a default layout. For example, as shown in FIG. 4, a user may use Create tab 401 to create a new layout. Layouts names that are visible to users are placed under column name Layout Label 402. Layouts names that are communicated with or to data management server 104 are placed under column Layout Name 404. Status of each layout (active or inactive) is placed under the column Status 405 and names of the object type for each layout are placed under the column Object Type 406. According to some embodiments, an object type may be a user-defined composite data type that contains a data structure, functions and procedures needed to modify the data or a classification within an object that allows users to store data that is similar but not identical in a single object. This example interface shows layout Master 403 as being selected as one of the default layouts for object named submission.

Figure 5:
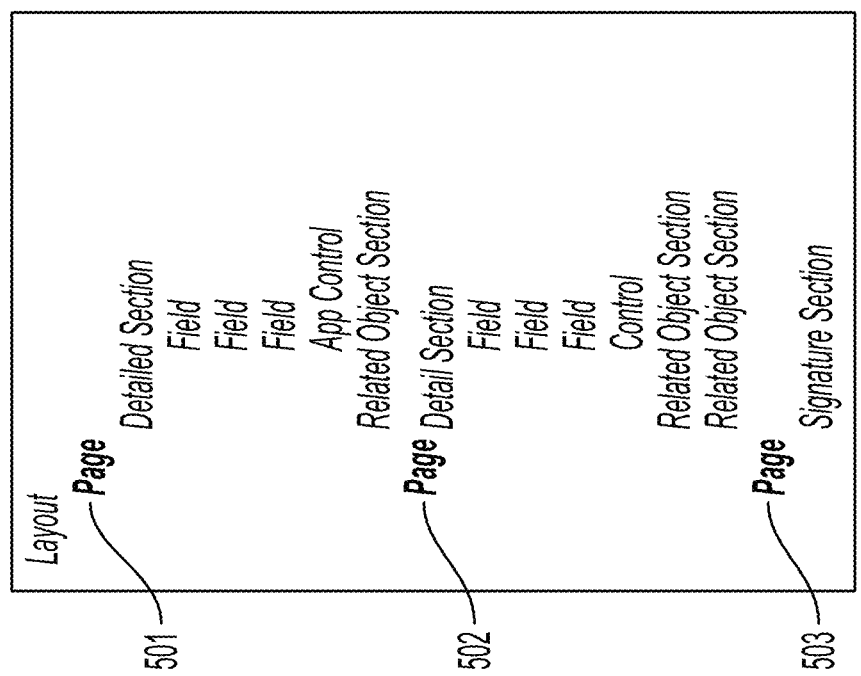
FIG. 5 illustrates an example of multiple pages present in a layout, according to some embodiments.

FIG. 5 illustrates an example of multiple pages present in a layout, according to one embodiment. As shown in FIG. 5, the layout has three pages (501, 502, and 503). Page 501 consist of six sections, Page 502 consist of seven sections and finally Page 503 has one section. In some embodiments, layout rules are applied to the object layout or object record data to streamline the data entry and analysis process by hiding irrelevant pages or sections on an object layout user interface based on a user's needs. For example, if a user decides to hide Page 502, then layout will only display sections that are present in pages 501 and 503. A real life example would be, a veterinary clinic may hide fields and sections related to dogs medicine on the patient record page if the patient is a cow.

Figure 7:
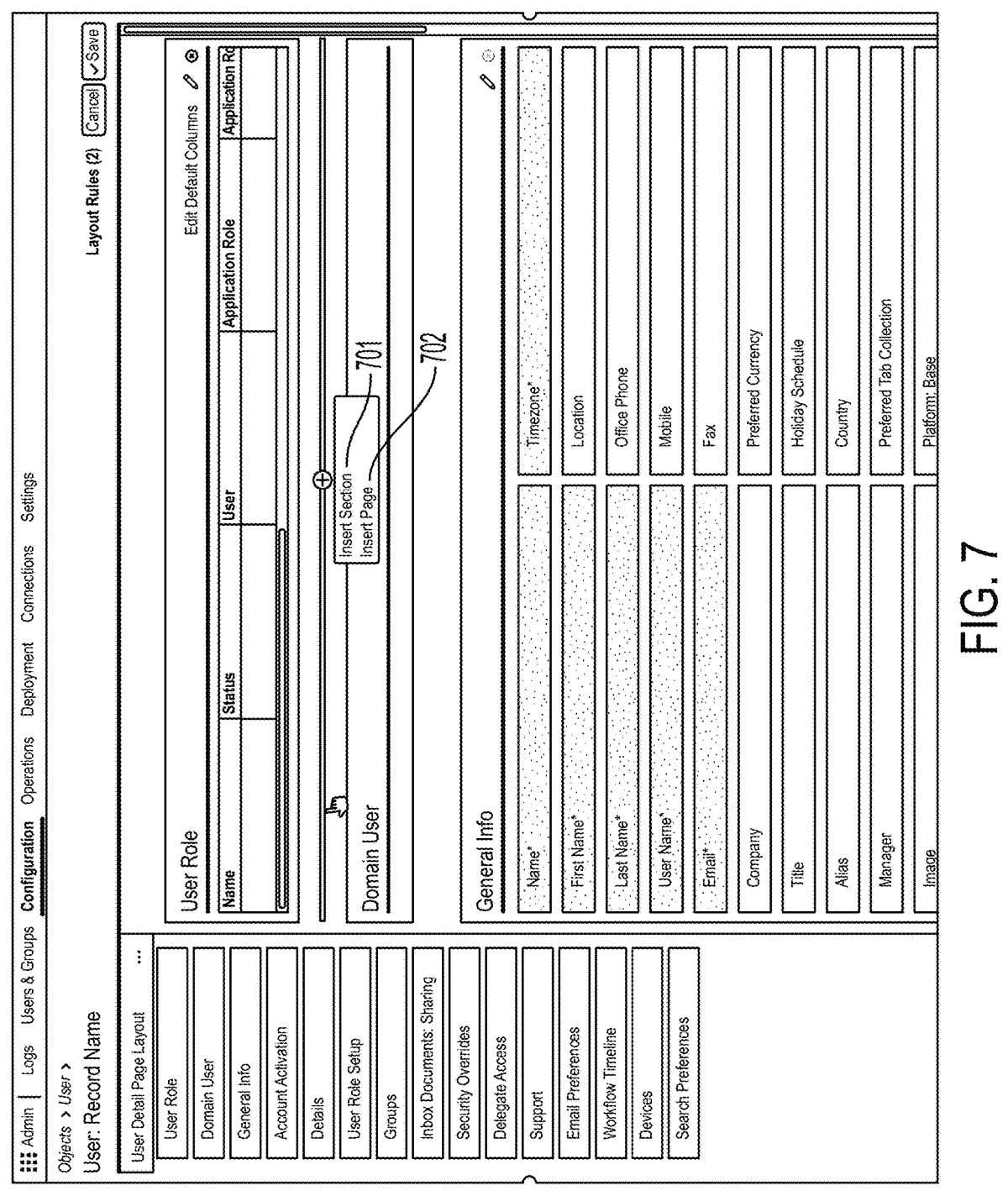
Figure 8:
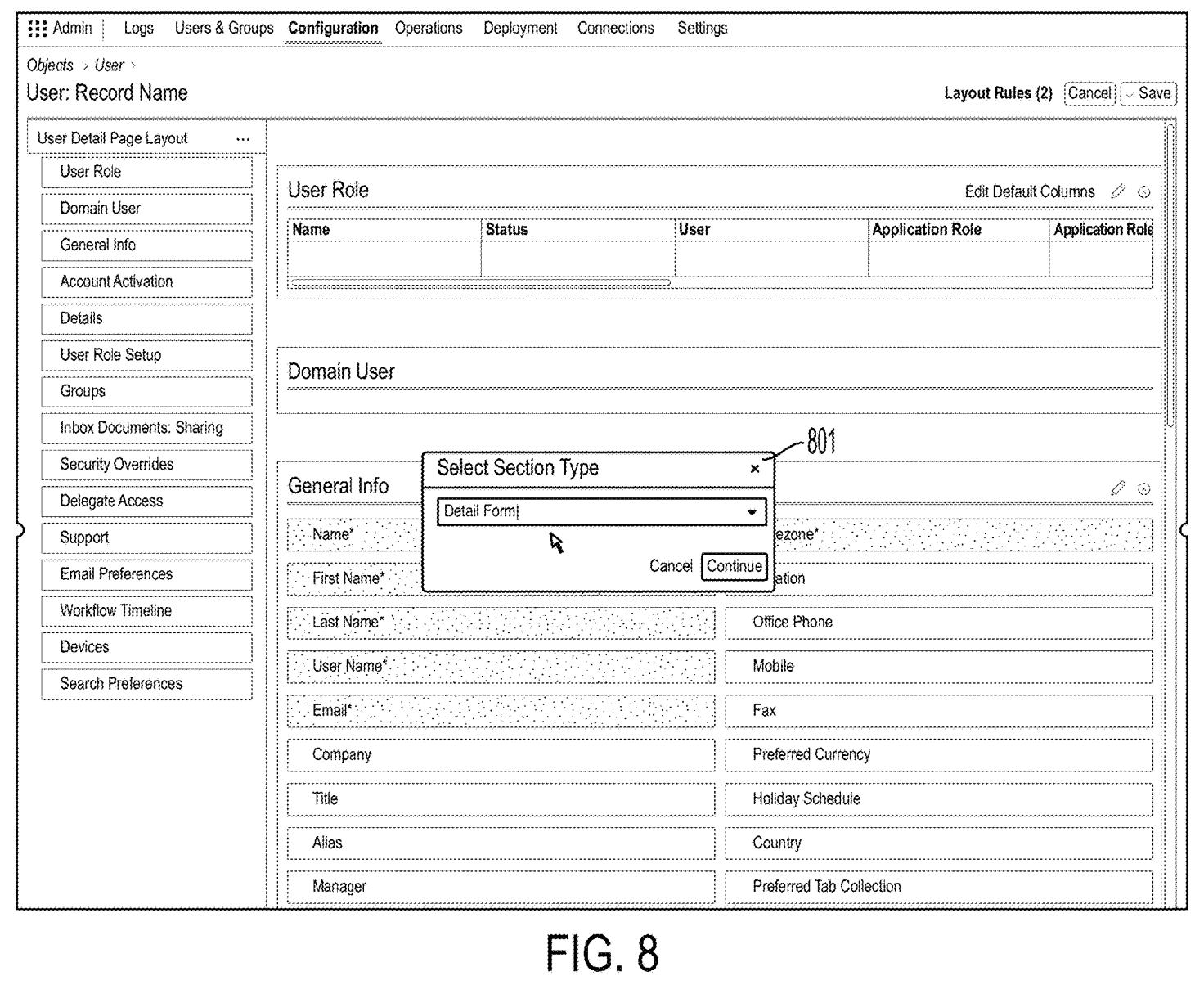
Figure 9:
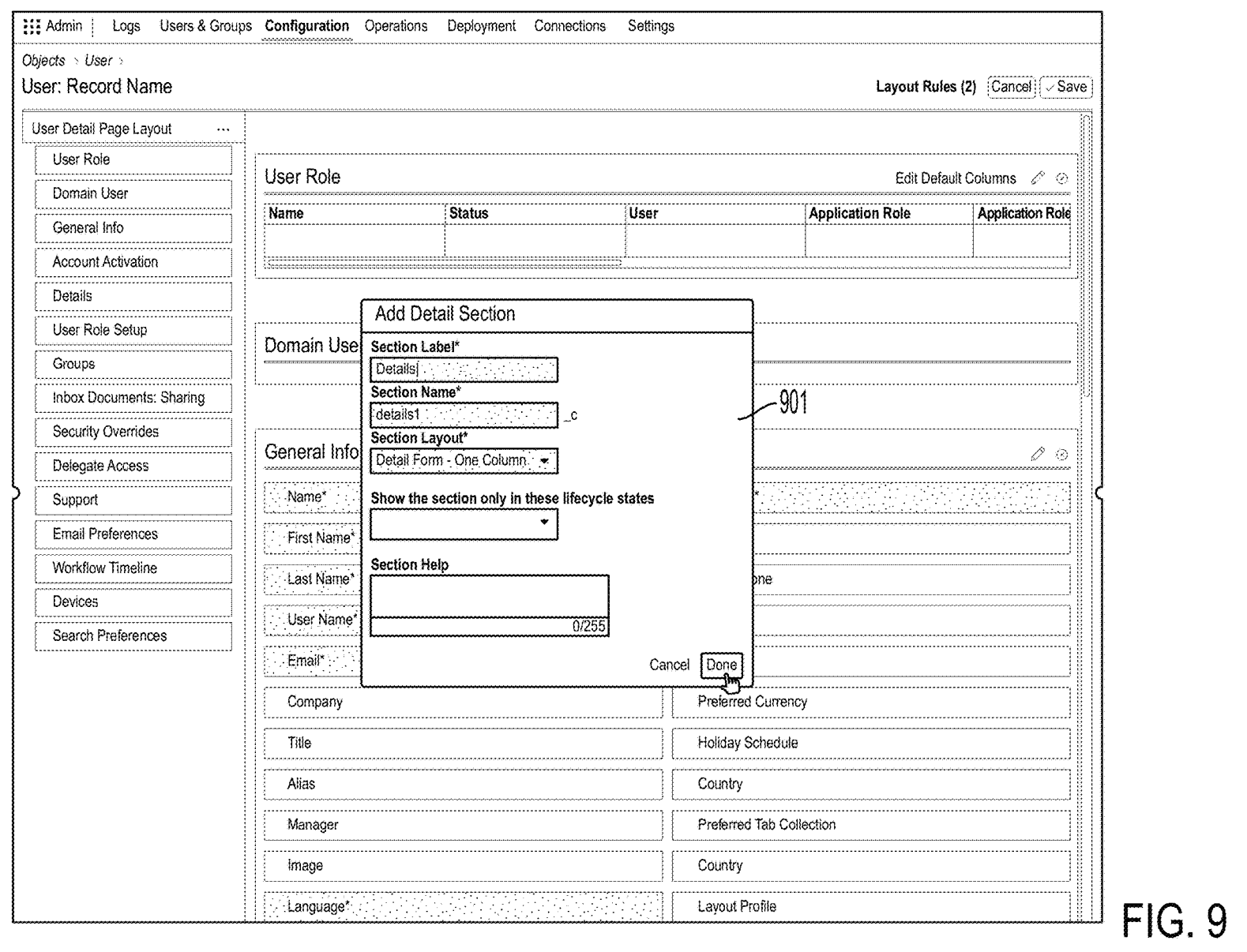
Figure 10:
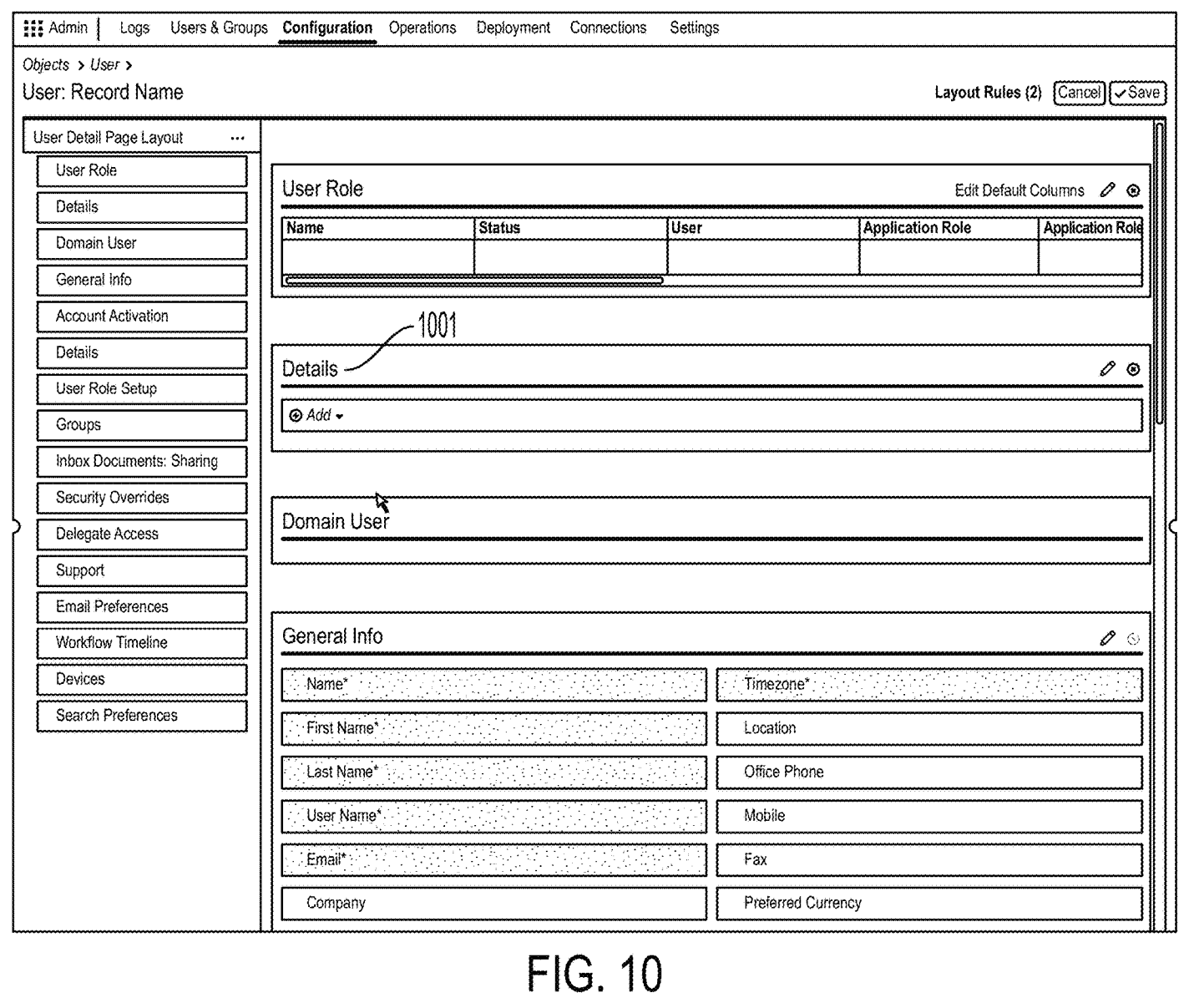
Figure 11:
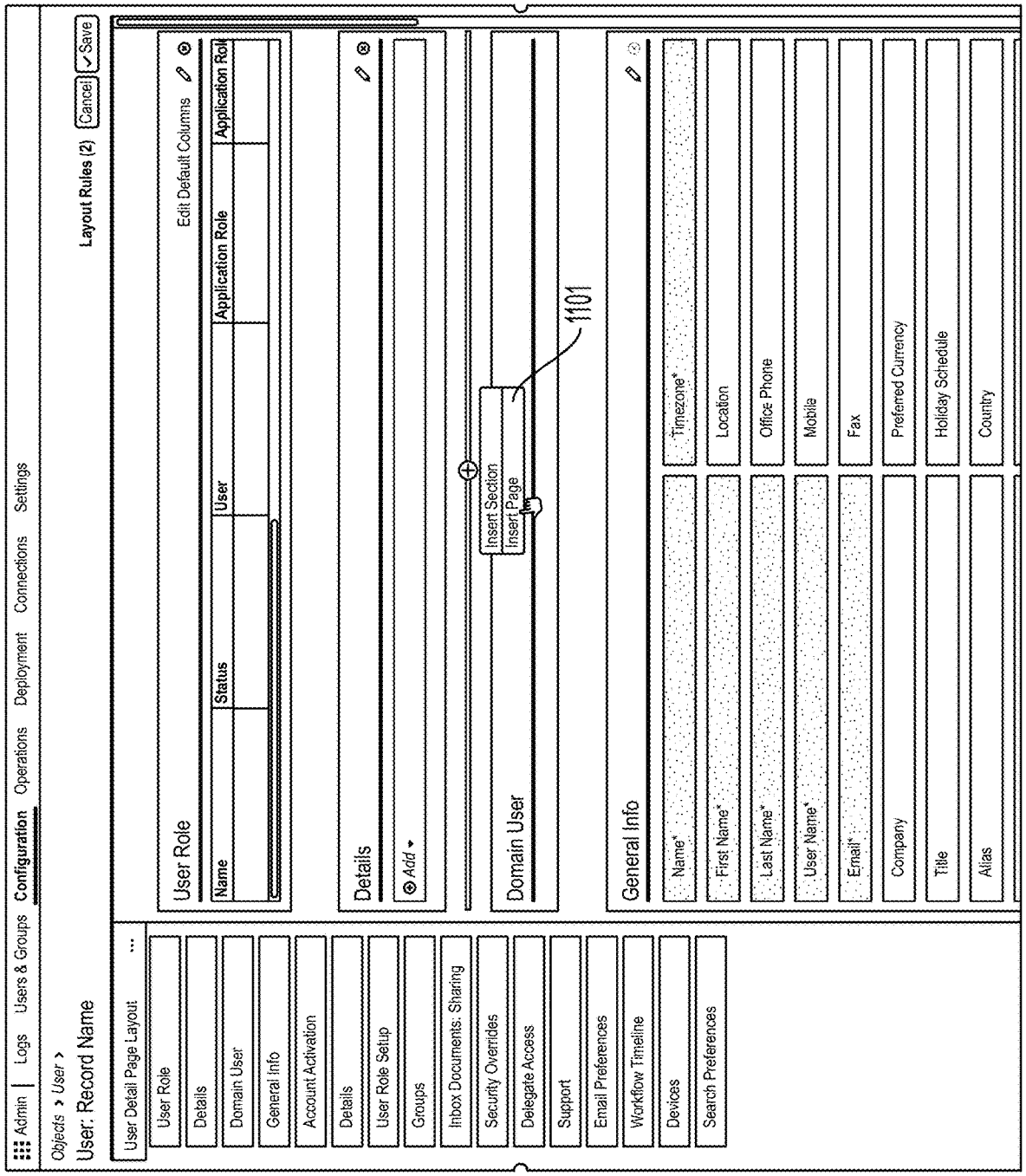
FIG. 11 illustrates an example user interface to insert new page using layout editor, according to some embodiments.
Figure 12:
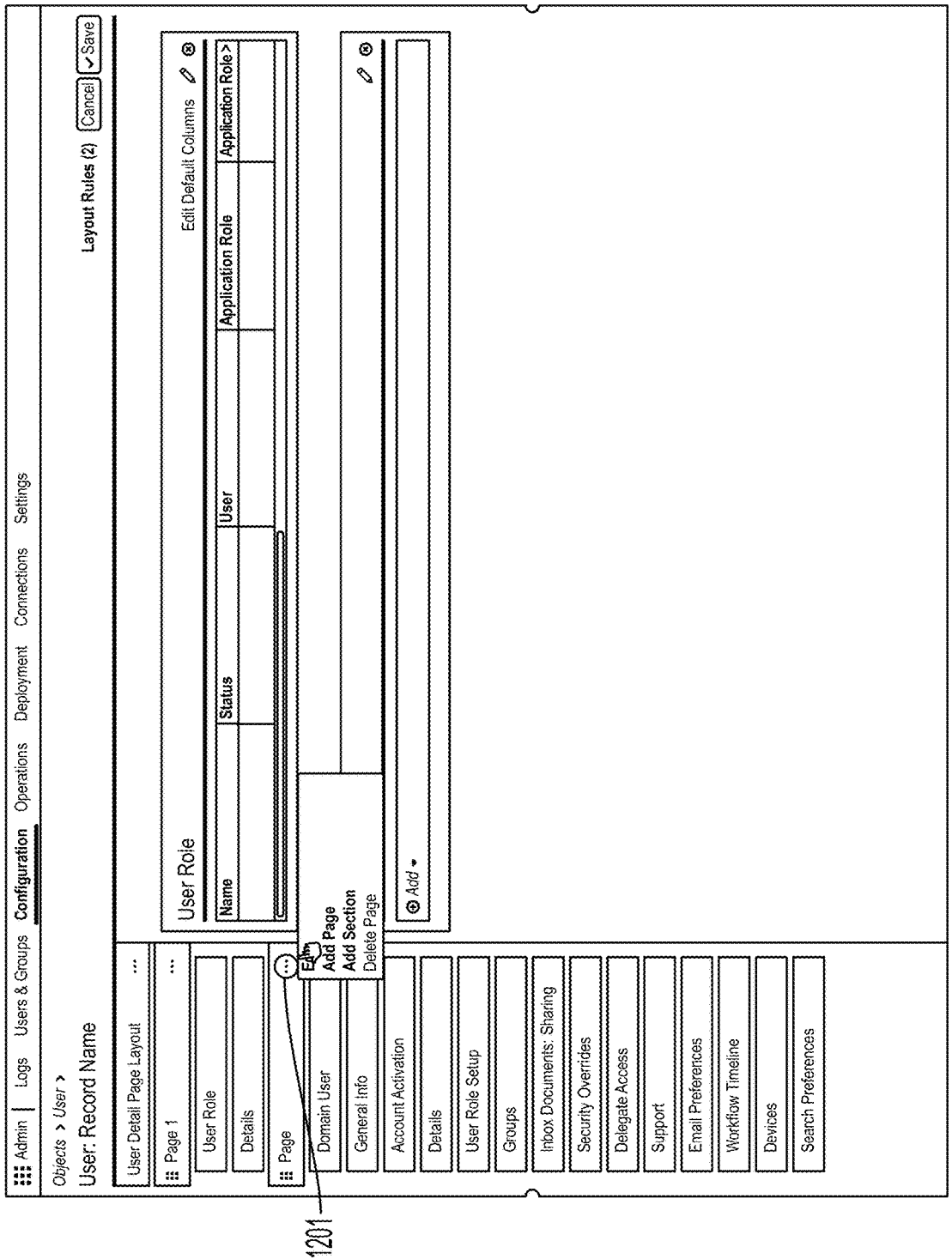
FIG. 12 illustrates an example user interface to edit new inserted page using layout editor, according to some embodiments.
Figure 13:
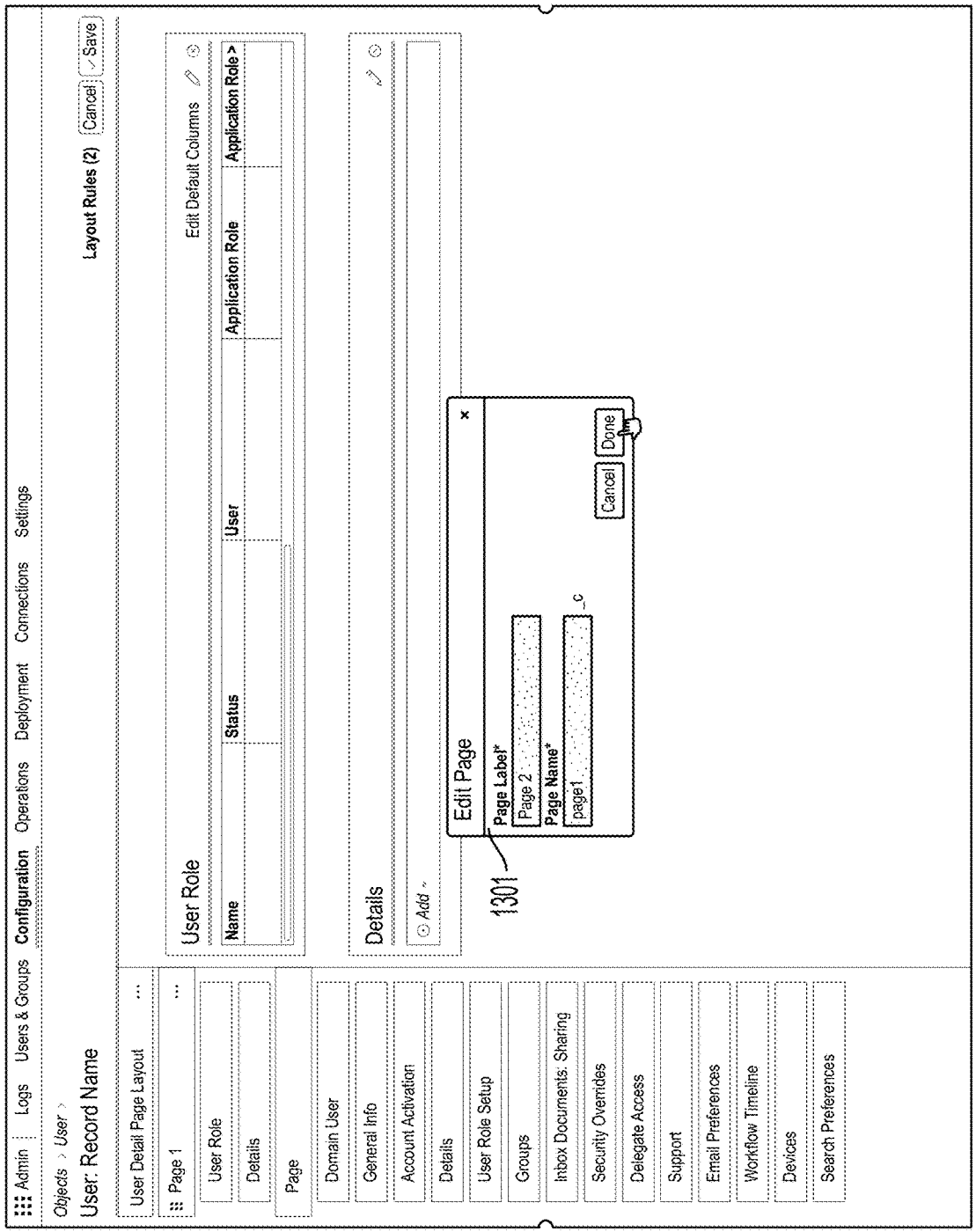
FIG. 13 illustrates an example user interface to add new page label using layout editor, according to some embodiments.
Figure 14:
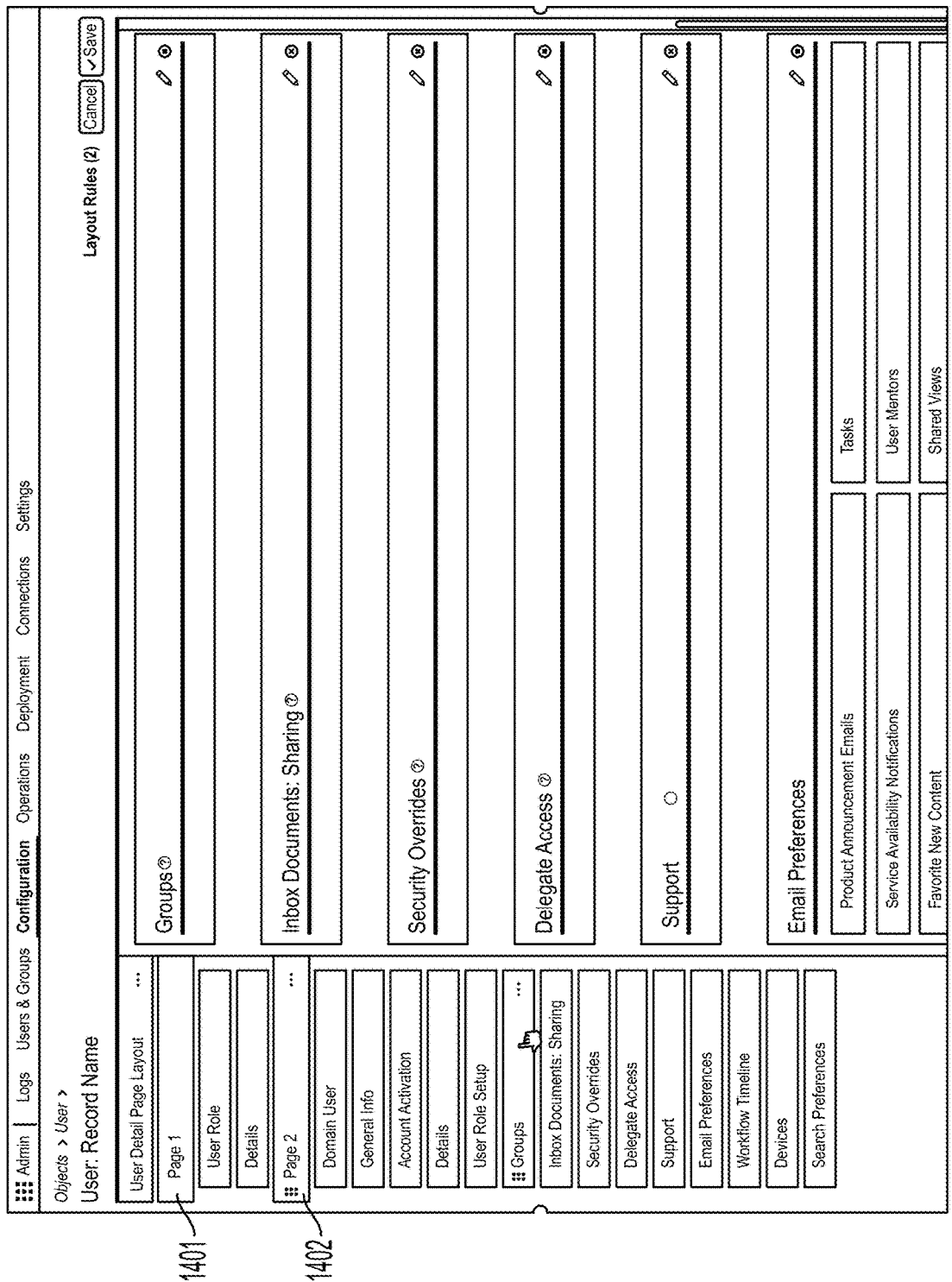
FIG. 14 illustrates an example user interface where two new pages are inserted in a layout using layout editor, according to some embodiments.

FIG. 6 illustrates an exemplary layout editor user interface for editing layouts, according to one embodiment. Moreover, in accordance with a preferred embodiment of the present disclosure, the editing changes include at least one of removing, modifying, adding, re-ordering, moving, updating and inserting at least one section. The leftmost portion of the layout editor 601 includes a listing of different sections. A user may drag the sections and rearrange the sequence. The Layout editor may also show details of content information fields within each section. For example, one of the sections Domain User 603 does not have any content information fields available yet to show details. Another section General Info 602 shows content information fields such as Name, First Name, Last Name, User Name, Email, etc. A user may insert a section or a page as shown in FIG. 7 by hovering in between two sections and then selecting the Insert Section 701 option to add a section or Insert Page 702 option to insert a page. If user decides to add a section, then after clicking Insert Section 701, a new pop up window Select Section type 801 as shown in FIG. 8 will open to select section type from the drop-down menu. After selecting the section type, the user may continue to next step which opens another pop-up window Add Detail Section, as shown in FIG. 9. This pop up window 901 allows the user to input or select following information: Section Label, Section Name, Section Layout (selected from drop-down menu), Lifecycles where selected sections should be visible (selected from drop-down menu). Moving to FIG. 10, this figure shows insertion of a section Details 1001 between sections User Role and Domain User, according to one embodiment. Similarly, FIG. 11 illustrates an example of page insertion between Sections Details and Domain User. User can perform this step by clicking on the Insert Page 1101 option. When a user clicks this option, a new page will be automatically inserted between the two sections as shown in FIG. 12. Page name may be modified by clicking on the ellipsis icon 1201. Clicking on the ellipsis icon 1201 opens a pop-up window with options such as edit, add page, add section and delete page. A user may edit a page by clicking on "edit" which opens a new pop-up window 1301, as shown in FIG. 13. The user may change the page label or page name as shown in FIG. 13, and continue to next steps by clicking on "done." Two new pages are created, i.e., Page 1 (1401) and Page 2 (1402), as shown in FIG. 14.

In one embodiment, users may need to navigate from page to page when creating or editing an object record. Saving an object record will save field edits made across pages. It should be noted that users may only see one page at a time and the edits made on pages that are not currently displayed will be saved at the same time. Data entry errors can occur on any page, including those not currently displayed, to help users avoid errors when required fields are missing values. An indicator next to the section will guide the user to those pages.

Figure 15:
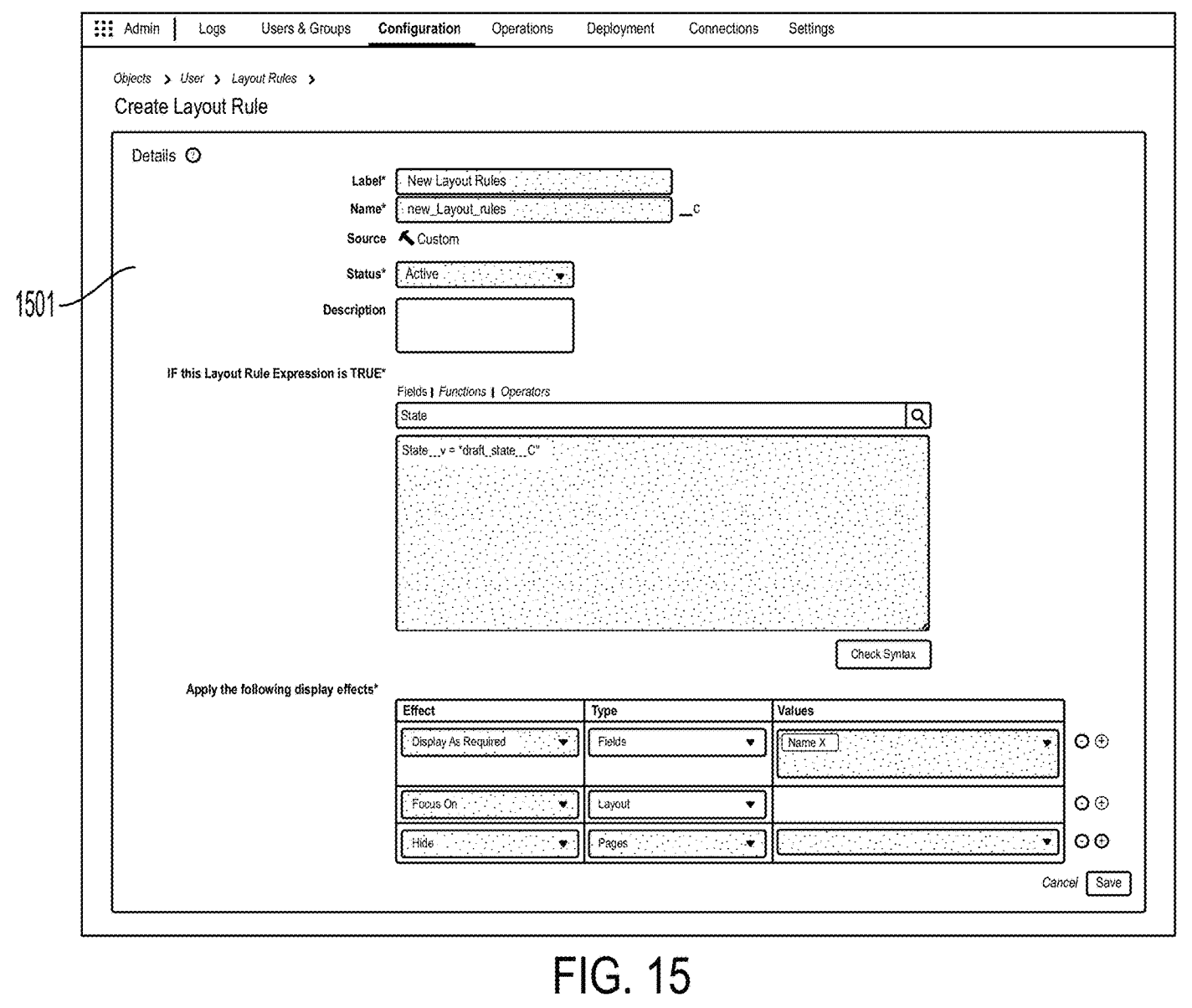

FIG. 15 illustrates a configuration user interface 1501 to create layout rules, according to one embodiment. Layout rules may dynamically alter layouts, hide irrelevant fields, sections, pages or layouts of an object or display information as required by user to provide contextual guidance. A detail box is provided for user to input different fields such as label, name, source, status, description etc. A user may input layout rules by selecting effects as shown in layout rule user interface 1501. The effects that may be selected are as follows: display as required (can be applied on fields when the user input text; a new field may or may not appear based on the input from the user), focus on (can be applied on layouts based on the state of the object; the layouts may be different to focus on the lifecycle state), and hide (can be applied to pages, sections, fields, controls or layouts; this hides non-relevant information per the user's requirement), display as read only (can be applied on fields to block user input). For example, to create a new hide layout rule, the user may: 1) enter a label and name for the layout rule, 2) enter the layout rule expression, which may be a Boolean (true/false) expression; the Fields, Functions, and Operators tabs may be used to search a list of options, 3) click check syntax (if there are no errors), 4) select the effect hide, select type of item to hide, 5) use the plus (+) and minus (−) icons to add or remove fields, sections or pages, and 6) finally click save. In some embodiments, visual effects may be used to differentiate the display of layouts to different user types.

Figures 16A, 16B:
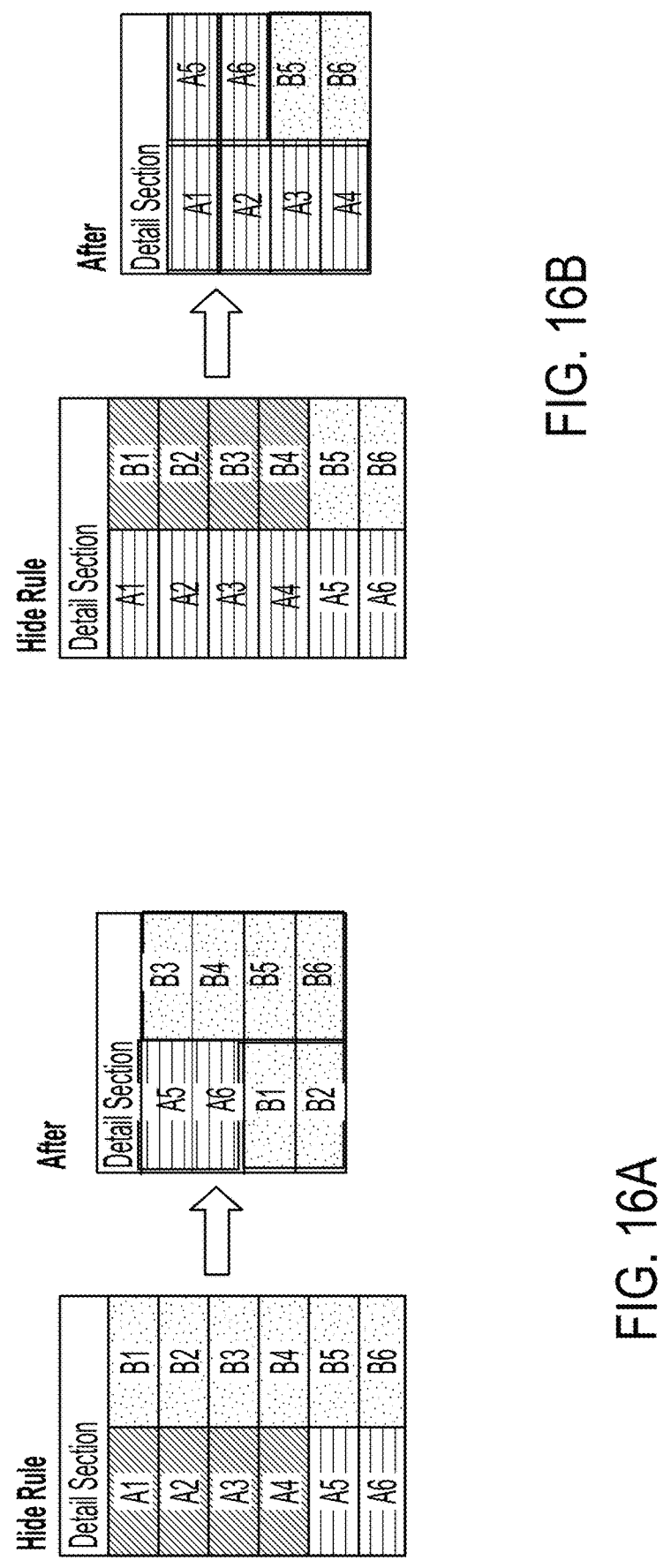

FIG. 16A and FIG. 16B are schematic diagrams illustrating column re-balancing after applying the hide layout rule. FIG. 16A shows an example embodiment where "hide rule" is applied to the fields "A1", "A2", "A3", and "A4" of the first column in a layout display. As shown in the left portion of the FIG. 16A, after hiding the fields "A1", "A2", "A3", and "A4", the system re-balances the columns such that equal number of fields are present in each column. Similarly, FIG. 16B shows another example embodiment where the "hide rule" is applied to the fields "B1", "B2", "B3", and "B4" of the second column in layout display. As shown in the left portion of the FIG. 16B, after hiding the fields "B1", "B2", "B3", and "B4", the system re-balances the columns such that equal number of fields are present in each column.

Figure 17:
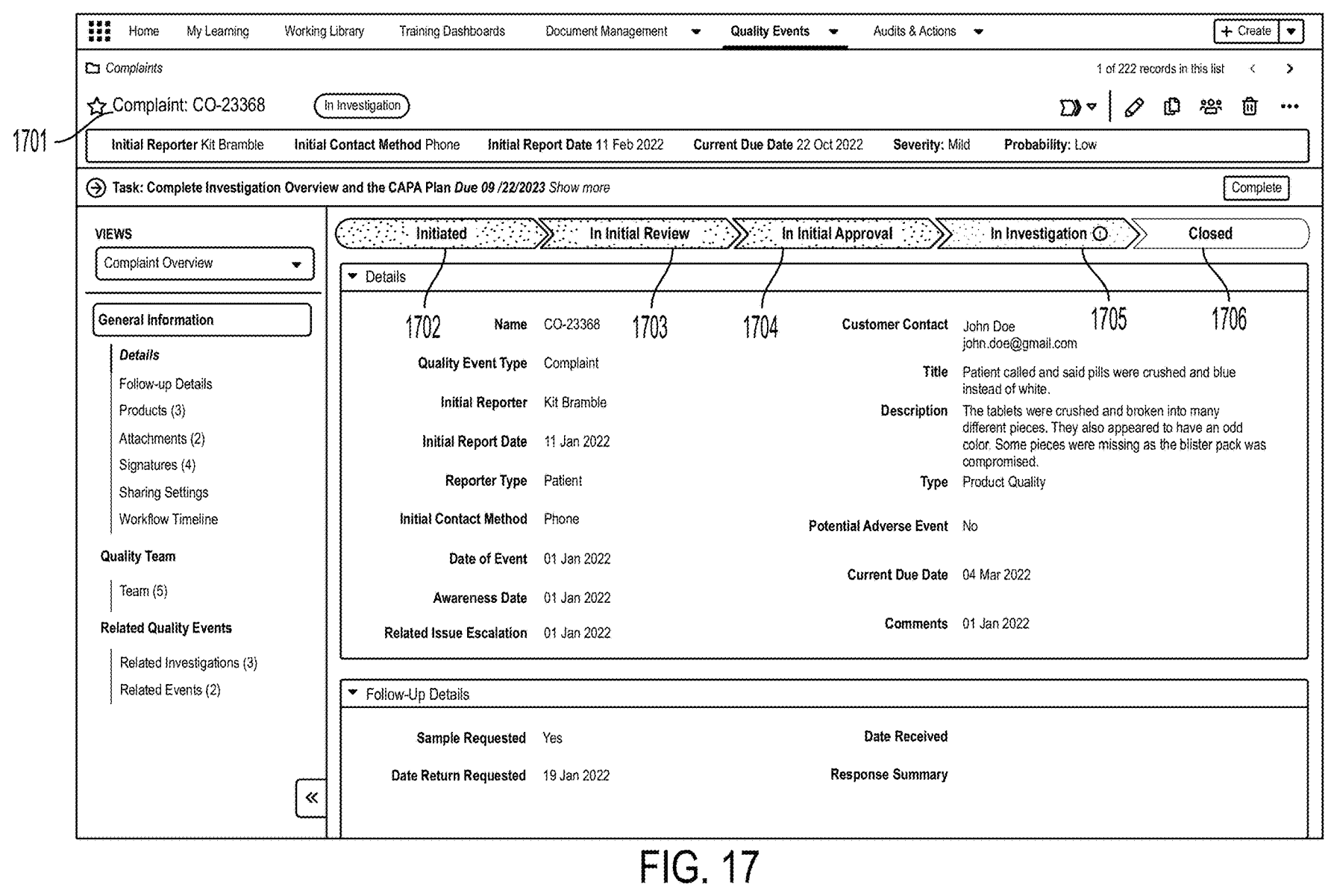

FIG. 17 illustrates an example user interface layout of a lifecycle state, according to some embodiments. An object may have multiple layouts for different lifecycle states. As shown in the FIG. 17, the different lifecycle states of object named Complaint 1701 are as follows: Initiated 1702; In Initial Review 1703; In Initial Approval 1704; In Investigation 1705, and Closed 1706. The Initiated state 1702 may generally be associated with the initial step when an activity for the object is initiated by an end user. The In Initial Review state 1703 may involve professionals reviewing documents and information connected to the object record. The In Initial Approval state 1704 may be initiated when an object record is approved for next step. The In Investigation state 1705 may be initiated when the object record is being investigated by an appropriate authority. Finally, the Closed state 1706 may be initiated when the object record has completed the previous lifecycle states successfully. It should be noted that the layout may be different for each lifecycle states. A user may notice layouts being changed automatically when the lifecycle states changes.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for using layout profiles to selectively display data to users, the method comprising:
   determining, using one or more computing device processors, a first object;
   generating, using the one or more computing device processors, a first layout for the first object, wherein the first layout comprises one or more first display sections and one or more second display sections;
   generating, using the one or more computing device processors, a second layout for the first object, wherein the second layout comprises the one or more first display sections and does not comprise the one or more second display sections;

generating, using the one or more computing device processors, a first layout profile comprising the first layout for the first object;

generating, using the one or more computing device processors, a second layout profile comprising the second layout for the first object;

assigning, using the one or more computing device processors, the first layout profile to a first user type, wherein the first layout profile is not assigned to a second user type;

assigning, using the one or more computing device processors, the second layout profile to the second user type, wherein the second layout profile is not assigned to the first user type;

determining, using the one or more computing device processors, a first user, of the first user type, accesses the first object;

in response to determining the first user accesses the first object is of the first user type, determining, using the one or more computing device processors, the first user type is associated with the first layout profile, and initiating display of, using the one or more computing device processors, the first layout, associated with the first layout profile, for the first object, such that the one or more first display sections and the one or more second display sections are displayed to the first user;

determining, using the one or more computing device processors, a second user, of the second user type, accesses the first object; and in response to determining the second user accesses the first object is of the second user type, determining, using the one or more computing device processors, the second user type is associated with the second layout profile, and initiating display of, using the one or more computing device processors, the second layout, associated with the second layout profile, for the first object, such that the one or more first display sections, and not the one or more second display sections, are displayed to the second user.

2. The method of claim 1, wherein the one or more first display sections comprises a first input section, wherein the first input section comprises guiding text that disappears in response to the first user entering input into the first input section.

3. The method of claim 1, wherein the first user type is associated with a first permission, wherein the first permission is associated with viewing or modifying a first element or field of a display section, and the second user type is associated with a second permission, wherein the second permission is associated with the viewing or modifying the first element or field, or a second element or field, of the display section.

4. The method of claim 1, further comprising providing a metadata loader for loading or modifying metadata into or comprised in the first layout profile or the second layout profile.

5. The method of claim 1, further comprising providing a layout editor for editing the first layout profile or the second layout profile.

6. The method of claim 5, wherein the layout editor is used to rearrange the one or more second display sections within the one or more first display sections.

7. The method of claim 5, wherein the layout editor enables saving, using a single selection of a save option, of multiple edits to at least one of the one or more first display sections or the one or more second display section.

8. The method of claim 1, further comprising receiving or configuring a first visual effect for at least one of the first layout profile, the first user type, or the first user, such that the one or more first display sections or the one or more second display sections are displayed, based on or using the first visual effect, to the first user; and receiving or configuring a second visual effect for at least one of the second layout profile, the second user type, or the second user, such that the one or more first display sections are displayed, based on or using the second visual effect, to the second user.

9. The method of claim 1, wherein one of the first layout profile further comprises a third layout for either the first object, a second object, or a third object, multiple layout profiles or multiple layouts are assigned to the first user or the first user type, or the first layout profile is assigned to multiple user types or multiple users.

10. The method of claim 1, wherein the one or more second display sections are hidden from the second user.

11. The method of claim 1, wherein the one or more first display sections are arranged adjacent to the one or more second display sections for the first user.

12. The method of claim 1, further comprising dynamically modifying the first layout profile or the second layout profile based on user data or a user function associated with the first user type or the second user type, respectively.

13. The method of claim 1, further comprising disabling inactive display sections from being added to the first layout profile or the second layout profile.

14. The method of claim 1, further comprising providing one or more display rules associated with at least one of the first layout profile, the second layout profile, the first user type, or the second user type.

15. The method of claim 1, further comprising enabling a user to generate or modify a third layout using the first layout or the second layout.

16. The method of claim 1, further comprising dynamically modifying the first layout or the second layout based on user data or a user function associated with the first user type or the second user type, respectively; and initiating display of a third display section, as part of the first layout, to the first user in response to receiving a first input into a fourth display section, as part of the first layout, from the first user, wherein the third display section is not displayed to the first user if the first input is not entered into the fourth display section, and wherein the third display section is configured to receive second input from the first user.

17. The method of claim 1, further comprising dynamically modifying the first layout or the second layout based on object data associated with the first object, or user data or a user function associated with the first user or the second user, respectively, at or about a time of the first user or the second user accessing the first object.

18. An apparatus for using layout profiles to selectively display data to users, the apparatus comprising:
one or more computing processors; and
memory storing instructions that, when executed by the one or more computing processors, causes the apparatus to:
determine a first object;
generate a first layout for the first object, wherein the first layout comprises one or more first display sections and one or more second display sections;
generate a second layout for the first object, wherein the second layout comprises the one or more first display sections and does not comprise the one or more second display sections;

generate a first layout profile comprising the first layout for the first object;

generate a second layout profile comprising the second layout for the first object;

assign the first layout profile to a first user type, wherein the first layout profile is not assigned to a second user type;

assign the first layout profile to the second user type, wherein the second layout profile is not assigned to the first user type;

determine a first user, of the first user type, accesses the first object;

in response to determining the first user accesses the first object is of the first user type, determine the first user type is associated with the first layout profile, and initiate display of the first layout, associated with the first layout profile, for the first object, such that the one or more first display sections and the one or more second display sections are displayed to the first user;

determine a second user, of the second user type, accesses the first object; and in response to determining the second user accesses the first object is of the second user type, determine the second user type is associated with the second layout profile, and initiate display of the second layout, associated with the second layout profile, for the first object, such that the one or more first display sections, and not the one or more second display sections, are displayed to the second user.

19. The apparatus of claim 18, wherein the one or more computing processors are comprised in one or more computing devices or servers, wherein the one or more computing devices or servers are located in one or more locations.

20. A non-transitory computer-readable medium comprising code configured or operable to:

determine a first object;

generate a first layout for the first object, wherein the first layout comprises one or more first display sections and one or more second display sections;

generate a second layout for the first object, wherein the second layout comprises the one or more first display sections and does not comprise the one or more second display sections;

generate a first layout profile comprising the first layout for the first object;

generate a second layout profile comprising the second layout for the first object;

assign the first layout profile to a first user type, wherein the first layout profile is not assigned to a second user type;

assign the first layout profile to the second user type, wherein the second layout profile is not assigned to the first user type;

determine a first user, of the first user type, accesses the first object;

in response to determining the first user accesses the first object is of the first user type, determine the first user type is associated with the first layout profile, and initiate display of the first layout, associated with the first layout profile, for the first object, such that the one or more first display sections and the one or more second display sections are displayed to the first user;

determine a second user, of the second user type, accesses the first object; and in response to determining the second user accesses the first object is of the second user type, determine the second user type is associated with the second layout profile, and initiate display of the second layout, associated with the second layout profile, for the first object, such that the one or more first display sections, and not the one or more second display sections, are displayed to the second user.

\* \* \* \* \*